United States Patent
Scarbrough et al.

(10) Patent No.: US 12,089,524 B2
(45) Date of Patent: Sep. 17, 2024

(54) METHODS AND SYSTEMS FOR INCREASING SOIL FERTILITY

(71) Applicant: Terraforma International, Inc., Lagunitas, CA (US)

(72) Inventors: Cooper A. Scarbrough, Lagunitas, CA (US); Miles G. Sorel, San Anselmo, CA (US)

(73) Assignee: Terraforma International Inc., Lagunitas, CA (US)

( * ) Notice: Subject to any disclaimer, the term of this patent is extended or adjusted under 35 U.S.C. 154(b) by 836 days.

(21) Appl. No.: 17/185,416

(22) Filed: Feb. 25, 2021

(65) Prior Publication Data
US 2021/0274703 A1 Sep. 9, 2021

Related U.S. Application Data

(60) Provisional application No. 62/984,723, filed on Mar. 3, 2020.

(51) Int. Cl.
| | | |
|---|---|---|
| A01C 21/00 | (2006.01) | |
| A01B 79/00 | (2006.01) | |
| A01C 23/00 | (2006.01) | |

(52) U.S. Cl.
CPC .......... *A01C 21/007* (2013.01); *A01B 79/005* (2013.01); *A01C 23/007* (2013.01)

(58) Field of Classification Search
CPC ..... A01C 21/007; A01C 23/007; A01C 21/00; A01C 23/00; A01B 79/005; A01B 79/00
See application file for complete search history.

(56) References Cited

U.S. PATENT DOCUMENTS

| | | |
|---|---|---|
| 2018/0105476 A1 | 4/2018 | Wallis et al. |
| 2019/0194081 A1 | 6/2019 | Bhallia et al. |
| 2019/0218153 A1 | 7/2019 | Price |

FOREIGN PATENT DOCUMENTS

| | | |
|---|---|---|
| CN | 105175177 | 12/2015 |
| CN | 108017422 | 5/2018 |
| CN | 108424184 | 8/2018 |

(Continued)

OTHER PUBLICATIONS

Cai et al. (2017) "A Review of the Combination Therapy of Low Frequency Ultrasound with Antibiotics" BioMed Research International, 2017: 1-14.

(Continued)

*Primary Examiner* — Christopher J. Novosad
(74) *Attorney, Agent, or Firm* — Edward J. Baba; Michael J. Blessent; Bozicevic, Field & Francis LLP

(57) ABSTRACT

Methods for increasing the fertility of a soil at a soil location include assessing a parameter of the soil, aerobically culturing a feedstock based on the assessment, generating a soil fertility composition from the cultured feedstock, and applying the soil fertility composition. The assessing can include measuring a biological parameter of the soil, a non-biological parameter of the soil, or a combination thereof. The culturing step includes thermally composting a feedstock, cooling the feedstock, and adding worms, and continuing to culture the feedstock. The methods can include inoculating the feedstock in order to enhance the quality of the final product, which will increase the fertility of the soil. Systems for performing the methods can include two or more subunits such that a cultured feedstock in one subunit can inoculate a fresh feedstock in another subunit.

30 Claims, 12 Drawing Sheets

(56) References Cited

FOREIGN PATENT DOCUMENTS

| WO | 2000043329 | 7/2000 |
| WO | 2005067550 | 7/2005 |
| WO | 2018236227 | 12/2018 |

OTHER PUBLICATIONS

Christi et al. (2003) "Sonobioreactors: using ultrasound for enhanced microbial productivity" Institute of Tech. and Engineering, 21(2): 89-93.

Csu Chico (2021) "How to Build Your Own Bioreactor" Johnson-Su Beam Research & Bioreactor Registry. The Center for Regenerative Agriculture and Resilient Systems, California State University, Chico. 6 pages. (https://www.csuchico.edu/regenerativeagriculture/bioreactor/bioreactor-instructions.shtml).

Matsuhashi et al. (1998) "Production of sound waves by bacterial cells and the response of bacterial cells to sound" J. Gen. Appl. Microbiol., 44: 49-55.

Pitt et al. (2003) "Ultrasound Increases the Rate of Bacterial Cell Growth" Biotechnol Prog., 19(3): 1038-1044.

Savchenko (2017) "Application of Low Intensity Pulsed Ultrasound for Microbial Cell Stimulation in Bioprocesses and development of Carbon-based Silver Covered Filters for Microbial Cells Removal in Water Systems" A Thesis written for the Dept. of Biomed. Engineering, 1-164.

METHODS AND SYSTEMS FOR INCREASING SOIL FERTILITY

CROSS-REFERENCE

This application claims priority to U.S. Provisional Application 62/984,723, filed Mar. 3, 2020, which is incorporated herein by reference.

INTRODUCTION

The agricultural yields of plants depend upon several factors including soil fertility, sunlight, temperature, and rainfall. Increasing soil fertility encompasses not only providing enough essential minerals to the plant, such as potassium, but also promoting the growth of beneficial microbes. These microbes can interact with the plants in complex ways, increasing agricultural yield. Although numerous beneficial microbes exist, their survival and proliferation depends upon numerous aspects of the soil. Moreover, whether a certain microbe is beneficial or harmful depends upon various factors, such as the identity of the agricultural plant.

SUMMARY

Provided are methods for increasing the fertility of a soil at a soil location by assessing a parameter of the soil, aerobically culturing a feedstock based on the assessment, generating a soil fertility composition from the cultured feedstock, and applying the soil fertility composition. The assessing can include measuring a biological parameter of the soil, a non-biological parameter of the soil, or a combination thereof. The culturing step includes thermally composting a feedstock, cooling the feedstock, and adding worms, and continuing to culture the feedstock. The methods can include inoculating the feedstock in order to enhance the quality of the final product, which will increase the fertility of the soil. Also provided are systems for performing the methods. The systems can include two or more subunits such that a cultured feedstock in one subunit can inoculate a fresh feedstock in another subunit.

An exemplary method of increasing the fertility of a soil at a soil location includes:
a) assessing a parameter of the soil;
b) aerobically culturing a feedstock based on the assessed parameter to produce a culturing product, wherein the culturing comprises: (i) thermally composting the feedstock; (ii) actively or passively cooling the feedstock; (iii) adding worms to the feedstock; and (iv) continuing to culture the feedstock, wherein at least part of the aerobic culturing is performed at a culturing location within 200 km of the soil location;
c) generating a soil fertility composition from the culturing product; and
d) applying the soil fertility composition to the soil at the soil location.

The assessing can include measuring a biological parameter of the soil. In some cases, the biological parameter is the mass of one or more of the fungi, bacteria, protozoa, nematodes, rotifers, or a combination thereof in the soil. In some cases, the assessed soil parameter is pH; the mass percentage of the soil that is sand, silt, and clay; moisture; or a combination thereof. The feedstock can include, for example, plant matter, animal fecal matter, or a combination thereof.

In some cases, the provided system is a system for aerobically culturing a feedstock to produce a culturing product, that includes:
a) two or more subunits that each comprise: (i) one or more side panels; (ii) an open top; (iii) a bottom comprising a bottom door; (iv) a first attachment member for lifting the subunit; (v) a second attachment member for connecting the subunit to another subunit;
b) a base configured such that the two or more subunits can sit on top of the base; and
c) a top configured to sit on top of and cover the two or more subunits;
wherein each subunit can be removed from the system independently such that a unit not removed from the system can continue to produce a culturing product.

DETAILED DESCRIPTION

Figure 1:
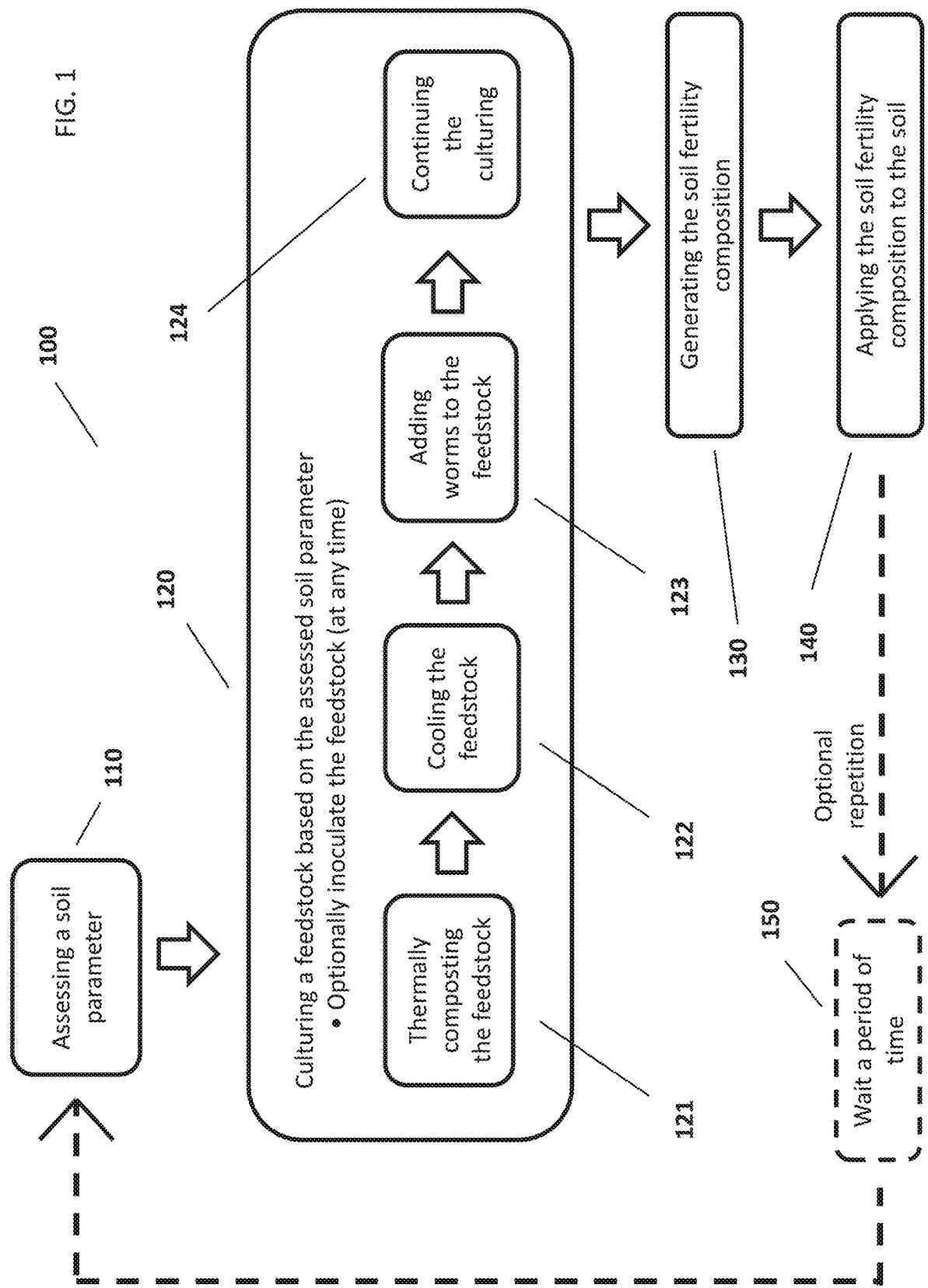
FIG. 1 shows a generalized method of increasing the fertility of a soil at a soil location.

Provided are methods for increasing the fertility of a soil at a soil location by assessing a parameter of the soil, aerobically culturing a feedstock based on the assessment, generating a soil fertility composition from the cultured feedstock, and applying the soil fertility composition. The assessing can include measuring a biological parameter of the soil, a non-biological parameter of the soil, or a combination thereof. The culturing step includes thermally composting a feedstock, cooling the feedstock, and adding worms, and continuing to culture the feedstock. The methods can include inoculating the feedstock in order to enhance the quality of the final product, which will increase the fertility of the soil. Also provided are systems for performing the methods. The systems can include two or more subunits such that a cultured feedstock in one subunit can inoculate a fresh feedstock in another subunit.

Before the present invention is described in greater detail, it is to be understood that this invention is not limited to particular embodiments described, as such may vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" include plural referents unless the context clearly dictates otherwise. Thus, for example, reference to "a droplet" includes a plurality of such droplets and reference to "the discrete entity" includes reference to one or more discrete entities, and so forth. It is further noted that the claims may be drafted to exclude any element, e.g., any optional element. As such, this statement is intended to serve as antecedent basis for use of such exclusive terminology as "solely", "only" and the like in connection with the recitation of claim elements, or the use of a "negative" limitation.

The publications discussed herein are provided solely for their disclosure prior to the filing date of the present application. Further, the dates of publication provided may be different from the actual publication dates which may need to be independently confirmed. To the extent the definition or usage of any term herein conflicts with a definition or usage of a term in an application or reference incorporated by reference herein, the instant application shall control.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Methods

As described above, provided are methods of increasing the fertility of a soil at a soil location. In some cases, the method follows the generalized method 100, as shown in FIG. 1. Soil fertility refers to the ability of the soil to encourage or permit the life and growth of a plant in the soil. "Soil fertility" as used herein relates to the relative amounts and types of both beneficial, neutral, and harmful microbes. The term "microbe" is used interchangeably with "microorganism" and includes, for example, bacteria, fungi, and protozoa. "Soil location" refers to the location of the intended use of the soil fertility composition. "Culturing location" refers to a location at least a part of the culturing step is performed. For instance, in one embodiment the continuing to culture step is performed within 200 km of the soil location. In this embodiment, the thermal composting, cooling, and worm addition steps can each be independently be performed either within 200 km of the soil location or beyond 200 km from the soil location.

In generalized method 100, a parameter of the soil is first assessed in step 110. Next, based on the assessed soil parameter, a feedstock is cultured in step 120. Step 120 includes individual steps of thermally composting the feedstock (121), cooling the feedstock (122), adding worms to the feedstock (123), and continuing to culture the feedstock for a period of time (124). Optionally, during the culturing the feedstock can be inoculated with an inoculant, e.g. a microbe. This inoculation can occur at any time, such as before the feedstock is thermally composted 121, during the cooling of the feedstock 122, or during the continuing of the culturing 124. After the feedstock is continued to be cultured for a period of time, a soil fertility composition is generated from the cultured feedstock in step 130. The soil fertility composition is then applied to the soil at the soil location in step 140. Optionally, steps 110, 120, 130, and 140 can be repeated one or more times. In such cases, after applying 140, a period of time is waited 150 before the assessing 110 is performed again. In such cases, the assessing can determine the effect of the first iteration of the method on the soil.

Exemplary Method

Figure 2:
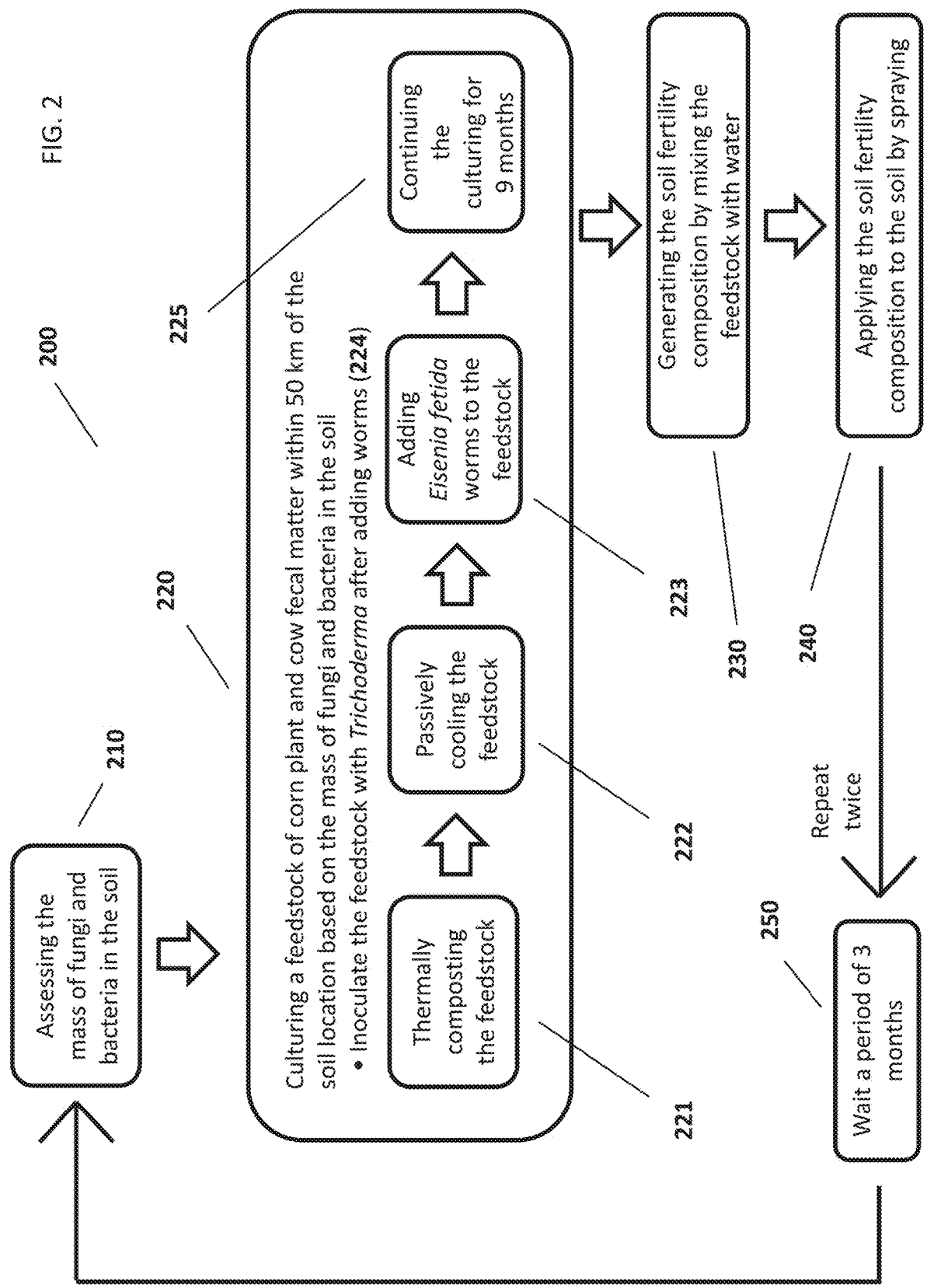
FIG. 2 shows an exemplary method of increasing the fertility of a soil at a soil location.

To illustrate one embodiment of generalized method 100, exemplary method 200 is shown in FIG. 2.

In exemplary method 200, assessing 210 involves assessing the mass of both fungi and bacteria in the soil. In some cases, the assessing 210 can include determining the ratio by mass of fungi and bacteria.

Based on the assessed masses of bacteria and fungi of the soil, culturing with a combined feedstock of corn plant matter and cow fecal matter is performed in step 220. This culturing is performed at 200 km or less, e.g. 50 km or less, from the location of the soil in order to employ environmental conditions that are similar to those at the soil location. Stated in another manner, the humidity, temperature, wind, sunlight, atmospheric pressure, and microbes present are similar at the culturing location to that of the soil location since the locations are within 200 km, e.g. 50 km, of one another.

Culturing 210 involves thermally composting the feedstock in step 221 and passively cooling the feedstock in step 222. Afterwards, *Eisenia fetida* (red wiggler) worms are added to the feedstock in step 223 to begin vermiculturing. The optional step of inoculating the feedstock is performed in exemplary method 200 by adding the inoculant *Trichoderma* in step 224 to the feedstock. Next, the feedstock is continued to be cultured for nine months in step 225. During the continuing step 225, optionally water, nutrients, microbe food, or other components can be added culturing feedstock.

During the continuation of culturing 225, optionally a parameter of the feedstock can be monitored, e.g., moisture. In other cases, the continuation of culturing 225 is passive, i.e., wherein no actions are taken.

After the continuation of culturing 225, the soil fertility composition is generated by mixing the cultured feedstock with water in step 230. Optionally, the resulting composition can be filtered in order to separate solids from liquids. Afterwards, the soil fertility composition is applied to the soil at the soil location by spraying the liquid in step 240.

In addition, in exemplary method 200 the steps of 210 through 240 are repeated twice. In particular, step 250 of waiting a period of three months is performed, after which the soil parameter of the mass of fungi and bacteria is assessed a second time (210). The waiting period 250 allows time for the soil fertility composition to have an effect on the soil.

For example, if the mass ratio of fungi:bacteria was determined to be lower than desired in the original assessing step, the original culturing could have been performed such that the soil fertility composition is high in fungi and low in bacteria. In fact, the inoculant of *Trichoderma* refers to a genus of fungi. During the second assessing step, the ratio of fungi:bacteria can once again be measured, and it can be determined whether the ratio was increased sufficiently. Accordingly, a second or possibly subsequent culturing, generating, and applying steps can be performed in order to achieve a fungi:bacteria ratio within an acceptable range.

The term "soil" is used interchangeably with "dirt" and refers to a mixture including minerals, organic matter, gases, and liquids. The soil can provide both the physical structure and chemical features that interact with roots of the plant and allow the plant to grow.

Assessing Step

The methods involve assessing one or more parameters of the soil, and the culturing step is performed based on the assessment. Soil parameters include biological parameters and non-biological parameters, e.g. chemical or physical parameters. The assessing can involve 2 or more parameters, such as 3 or more, 4 or more, 5 or more, or 10 or more. The assessing can involve 1 or more biological parameters, such as 2 or more, 3 or more, 4 or more, 5 or more, or 10 or more. The assessing can involve 1 or more non-biological parameters, such as 2 or more, 3 or more, 4 or more, 5 or more, or 10 or more. In some cases, the assessing involves 1 or more each of biological and non-biological parameters, such as 2 or more each, 3 or more each, 4 or more each, or 5 or more each.

An exemplary biological parameter is the total mass of one or more of fungi, bacteria, protozoa, nematodes, and rotifer. For example, the biological parameter might involve an assessment that there is 2 grams of fungi, 5 grams of bacteria, 1 gram of protozoa, and 3 grams of nematodes in a soil sample. In other cases, the soil parameter might be an assessment that there is 8 grams of fungi and 2 grams of bacteria, i.e., a 4:1 mass ratio of fungi:bacteria. Thus, the biological parameter can be a ratio between the masses of any two of fungi, bacteria, protozoa, rotifers, and nematodes.

In some cases, the biological parameter is which species of microbes are present in the soil. In some cases, the biological parameter is mass of a particular type of microbe. Exemplary types of microbes include nitrifiers, phosphorous mobilizers, potassium mobilizers, and carbon mineralizers. Additional exemplary types of microbes include protective, stimulatory, nutrient mobilizing, carbon sequestering, and immunizing. These functions can be the result of a single organism or as the combined result of multiple different organisms. For example, a first *bacillus* mobilizes nitrogen and a second *bacillus* mobilizes phosphorous. However, together the two *bacillus* mobilize nitrogen, phosphorous, and potassium. The biological parameter can also account for the relative amount of each species of microbe in the soil. In some cases, the biological parameter is the relative amounts of two or more species of microbes to one another. The two or more microbes that are assessed can be fungi, bacteria, protozoa, rotifers, and nematodes. The biological parameter can be the ratio of two microbes to another by mass. The assessed parameter can be a biological parameter, such as the amount of fungi, bacteria, protozoa, nematodes, rotifer, and other organisms in the soil.

An exemplary non-biological parameter is the mass percentage of the soil that is sand, silt, and clay. In some cases, the non-biological parameter is pH, the ratio of organic matter to inorganic matter by mass, or the ratio of calcium to magnesium by mass. The non-biological parameter can also be the concentration of nitrogen, phosphorous, potassium, or a combination thereof in the soil.

The soil parameters can be assessed with any suitable method known in the art. For example, the presence and relative amount of different types of microbes, e.g., bacteria and fungi, can be assessed by polymerase chain reaction (PCR).

In some cases, the assessed pH of the soil ranges from 4.0 to 10.0, such as from 4.5 to 9.5, from 5.0 to 9.0, from 5.5 to 8.5, from 6.0 to 8.0, or from 6.5 to 7.5. In some cases, the pH is 8.0 or less. In some cases, the pH is 6.0 or more.

In some cases, the assessed soil moisture is measured on a volume/volume basis, i.e., the volume of water present in certain volume of soil. In some cases, the volumetric water content ratio is 0.5 or less, such as 0.4 or less, 0.3 or less. 0.2 or less, or 0.1 or less. In some cases, the volumetric water content is 0.1 or more, such as 0.2 or more, 0.3 or more, 0.4 or more, or 0.5 or more. In some cases, the water content ranges from 0.05 to 0.3, such as from 0.15 to 0.25. Water content, which is also referred to as moisture content and soil moisture, of the soil can be measured by any suitable method, such as drying in an oven or the Dean-Stark or Karl Fischer titration methods.

In some cases, the assessed amount of organic matter in soil by mass ranges from 0.1% to 90%, such as from 0.5% to 50%, from 1% to 25%, from 2% to 10%, or from 3% to 8%. Such amounts refer to the amount of organic matter compared to the total amount of inorganic and organic matter in the soil. For example, 2% organic matter refers to a mass ratio of 2:98 of organic matter to inorganic matter.

In some cases, the amount of sand in the soil ranges from 2% to 95%, such as from 5% to 75%, from 10% to 50%, and from 20% to 40%. In some cases, the amount of silt in the soil ranges from 2% to 95%, such as from 5% to 75%, from 10% to 50%, and from 20% to 40%. In some cases, the amount of clay in the soil ranges from 2% to 95%, such as from 5% to 75%, from 10% to 50%, and from 20% to 40%.

Culturing Step

During culturing and breakdown of the feedstock, various microbe populations grow in the feedstock. The identities and relative amounts of these microbes depend upon various factors, including the type of feedstock employed, which microbes were initially present in the feedstock, which microbes are present in the culturing environment, temperature, sunshine, wind, and moisture, among other factors. As such, "culturing a feedstock" refers to the biological degradation of the feedstock by microbes.

Thermal composting refers to the significant initial heating of the feedstock due to microbe activity during the culturing step. In some cases, the feedstock is heated to 50° C. or more for 10 minutes or more, such as for 20 minutes or more, 30 minutes or more, 50 minutes or more, 100 minutes or more, 500 minutes or more, or 1,000 minutes or more. In some cases, the feedstock is heated to 50° C. for 10 minutes or more, such as for 20 minutes or more, 30 minutes or more, 50 minutes or more, 100 minutes or more, 500 minutes or more, or 1,000 minutes or more. In some cases, the feedstock is heated to 110° C. for 10 minutes or more, such as for 20 minutes or more, 30 minutes or more, 50 minutes or more, 100 minutes or more, 500 minutes or more, or 1,000 minutes or more.

After the thermal composting step, the feedstock is cooled, either through passive cooling or active cooling. As used herein, passively cooled refers to the cooling of the feedstock without intervention. Active cooling refers to any action that increases the rate of cooling compared to passive cooling. Active cooling can include moving the feedstock, such as by churning or rotating, in order to expose higher temperature regions to the cooler external environment, or by passing liquids or gasses through the compost functioning as a heat exchanger.

After the cooling step, worms are added to cause vermicomposting. Exemplary species of worms that can be added include *Eisenia fetida* (red wiggler worm), *Eisenia andrei*, *Eisenia hortensis*, and *Dendrobaena veneta*. In some cases, the method involves adding *Eisenia fetida* (red wiggler) worms. In some cases, the ratio of worms to feedstock ranges from 1:50 to 1:10,000 by mass, such as from 1:100 to 1:5,000, from 1:200 to 1:1,000, and from 1:300 to 1:700. In some cases, the ratio of worms to feedstock is 1:200 or less, such as 1:500 or less or 1:1,000 or less. In some cases, the ratio of worms to feedstock is 1:1,000 or more, such as 1:500 or more, or 1:200 or more.

After adding worms, the feedstock continues to be cultured for a period of time before the soil fertility composition is generated. Stated in another manner, the feedstock is continued to be cultured for a period of time. This time period can be referred to as the vermicomposting time period or maturation time period.

In some cases, the continuation of culturing step is performed for a time period ranging from 30 days to 720 days, such as 60 days to 630 days, 120 days to 540 days, 180 days to 450 days, or 270 days to 360 days. In some cases, the continuation is for 120 days or more, such as 180 days or more, 270 days or more, or 360 days or more. During the vermicomposting time period the relative amounts of each microbe will vary. The time at which the vermicomposting is ended, i.e., when the feedstock is used to generate the soil fertility composition, is chosen in order to maximize the fertility benefit at the soil location. Stated in another manner, when the optimal mixture of microbes is achieved for increasing soil fertility, the vermicomposting, i.e. the continuation of culturing step, is ended and the soil fertility composition is generated.

Feedstock

The feedstock for the culturing step is the material that is subjected to the thermal composting, cooling, and addition of worms steps. During the culturing step, the feedstock is referred to herein interchangeably as "the feedstock" and "the partially cultured feedstock". The feedstock can include plant material, animal fecal matter, or a combination thereof. The plant material can be leaf material, wood material, grass material, or a combination thereof. Exemplary animals that the animal fecal matter can be sourced from include cows, sheep, pigs, horses, turtles, llamas and chickens.

In some cases, the feedstock is obtained from within 200 km, e.g. within 50 km, of the soil location. In such cases, the method can provide the advantage that the feedstock contains microbes that are able to survive and proliferate in the environment of the soil location. Exemplary factors that are included in "the environment" include any of the soil parameters described elsewhere, in addition to patterns of rainfall, temperature, sunlight, humidity, and wind. Such microbes present in the feedstock might increase the fertility of the soil.

The feedstock can include material from a plant that is planned to be grown at the soil location, e.g. corn, soybean, cotton, wheat, barley, and banana. This material can be leaf material, stalk material, root material, seed, or fruit. For instance, the corn kernels from a corn plant can be used as part of the feedstock. In cases wherein the plant material includes root material, the roots can have microbes that specifically interact with the plant. For instance, if the roots of a corn plant are included in the feedstock, then microbes associated with the corn plant can be placed into the feedstock, potentially making the cultured feedstock more suitable for application to soil where additional corn is planned to be grown.

Other advantages of employing feedstock obtained from within 200 km, e.g. within 50 km, of the soil location feedstock include reducing costs and ecological harm from the transport of feedstock over long distances and reducing the introduction of non-native species of microbes to the soil location.

In some cases, the feedstock is plant material from a species of plant that is the same species planned to be grown at the soil location. As such, the feedstock might contain a microbe that could benefit the species of plant to be grown at the soil location.

In some cases, the feedstock includes plant material, wherein the plant was grown without one or more of pesticides, herbicides, and manmade fertilizers. In some cases, the plant was not genetically engineered. In some cases, the feedstock includes animal fecal matter, and the animal was not genetically engineered.

Culturing Conditions

By culturing the feedstock at a certain location, certain factors such as temperature, presence of microbes during culturing, sunshine, wind, and moisture can be selected for. In particular, by selecting a culturing location that has a similar environment to the location of the intended use of the soil fertility composition, i.e., the "soil location" as used herein, then culturing can select for and acclimatize microbes suitable for the soil location during the culturing step. Stated in another manner, in order to increase the soil fertility at a soil location then certain microbe populations can be produced during the culturing step. However, since the survival and proliferation of microbes depends on various environmental factors, culturing in an environment similar to the soil location will provide for microbes that can survive, proliferate, and benefit the agricultural plant at the soil location. This environmental similarity is achieved at least in part by culturing within a certain distance, e.g., within 200 km or within 50 km, of the soil location.

In some cases, the soil fertility composition can be designed to benefit a particular type or species of plant that is being grown, or is planned to be grown, at the soil fertility location. Exemplary plants include corn, wheat, rice, potato, or soy. The designing can involve which parameter is assessed, how the aerobic culturing is performed, or a combination thereof. In some cases, the soil fertility composition is not designed for a particular type or species of plant, but rather is designed to increase soil fertility in general.

The culturing step is performed at a location, i.e. a "culturing location". In some cases, the culturing is performed within 200 km of the soil location, such as within 150 km, 100 km, 75 km, 50 km, 40 km, within 30 km, within 20 km, within 10 km, within 5 km, within 2 km, within 1 km, or within 0.5 km. The culturing step can be performed outdoors. The culturing step can be performed indoors. In some cases, the culturing is performed at a single culturing location. In some cases, the culturing is performed at two or more locations that are each within 50 km or less of the soil location, such as within 40 km, within 30 km, within 20 km, within 10 km, within 5 km, within 2 km, within 1 km, or within 0.5 km The culturing step can be performed such that the temperature, humidity, atmospheric pressure, soil moisture, or a combination thereof is relatively similar to that at the soil location.

In some cases, for 50% or more of the duration of the culturing step the air temperature at the culturing location is with 5° C. of the air temperature at the soil location, such as 75% or more, 90% or more, 95% ore more, or 99% or more.

In some cases, for 50% or more of the duration of the culturing step the relative humidity at the culturing location is with 10% of the relative humidity at the soil location, such as 75% or more, 90% or more, 95% or more, or 99% or more.

Atmospheric pressure at a particular location, i.e. the pressure of outdoor air at a particular location, varies based on several factors including elevation above sea level and current weather conditions. Although atmospheric pressure can vary on an hourly, daily, or weekly basis based on weather events like rainstorms and monsoons, the average pressure at a location primarily depends on its elevation above sea level. The present methods can in some cases be used to select for microbes that are adapted to the atmospheric pressure at the soil location. Thus, in some cases the culturing location, e.g. during the continuing to culture step, can have an atmospheric pressure similar to the soil location. For example, atmospheric pressure at sea level is about 100 kPa whereas the atmospheric pressure at an elevation of 2,000 m is about 80 kPa (Portland State Aerospace Society, 2004, "A Quick Derivation Relating Altitude to Air Pressure"). In some cases, the difference in average atmospheric pressure between the culturing location and the soil location is 20 kPa or less, such as 10 kPa or less or 5 kPa or less. The culturing location and soil location can differ in elevation by, for example, 2000 m or less, 1000 m or less, or 500 m or less.

In some cases, for 50% of the duration of the culturing step the feedstock being cultured is within 10% of the moisture of the soil moisture at the soil location, such as 75% or more, 90% or more, 95% or more, or 99% or more.

In some cases, for 50% of the duration of the culturing step the feedstock being cultured is within 10% of the moisture of the soil moisture at the soil location and the temperature at the culturing location is within 5° C. of the temperature at the soil location, such as 75% or more, 90% or more, 95% or more, or 99% or more.

The culturing step is performed aerobically. As used herein, aerobic culturing is culturing wherein the average ratio of aerobic microbes to anaerobic microbes during the culturing step greater than 1:1 by mass. In some cases, the ratio of aerobic microbes to anaerobic microbes during the culturing step is 5:1 or more by mass, such as 10:1 or more, 15:1 or more, 20:1 or more, 50:1 or more, or 100:1 or more. In some cases, the aerobic culturing is performed at an oxygen concentration in the feedstock of 0.5 ppm or more, such as 3 ppm or more or 10 ppm or more.

Aerobic culturing is culturing wherein the average ratio of aerobic microbes to anaerobic microbes during the culturing step greater than 1:1 by mass. The terms aerobically culturing and aerobically composting are used interchangeably herein.

Actions During Culturing

During the culturing step, one or more culturing parameters of the feedstock can be monitored. The monitoring can be continuous or intermittent. In some cases, the monitoring is performed automatically by an electronic sensor, e.g. that is operably connected to an electromechanical device that can add material to the feedstock.

Non-biological culturing parameters include pH, moisture content, temperature, ratio of organic matter to inorganic matter by mass, and the size distribution of the pieces of feedstock.

Biological culturing parameters include: the mass of fungi, bacteria, protozoa, nematodes, rotifers, or a combination; the species of such organisms present; ratio by mass of particular species of such organisms that are present; whether a given species of such organisms are present. In some cases, the biological culturing parameter is the ratio by mass of two of fungi, bacteria, protozoa, rotifers, nematodes, e.g., the ratio of fungi to bacteria by mass.

The feedstock can be acted upon during the culturing step according to a pre-determined schedule, based on one or more culturing parameters, or a combination thereof. The acting upon includes, for example, adding a biological inoculant, adding water, adding microbe food, adding worms, or a combination thereof. The addition can be performed automatically or due to action by an operator.

Material that can be added during the culturing includes water, a microbe food, a microbe growth accelerator, worms, a biological inoculant, a pH adjusting agent, and a mineral. For instance, the mineral can have phosphorous, calcium, magnesium, nitrogen, or another chemical element that can help with biological activity.

Biological Inoculation

The terms inoculation and biological inoculation are used interchangeably herein. The feedstock can be inoculated before the beginning of the culturing step, or at any time during the culturing step. In some cases, the feedstock is inoculated before the culturing step. In some cases, the feedstock is inoculated during the culturing step. The feedstock can be inoculated during the thermal composting, cooling, adding worms steps, or after adding worms steps, or a combination thereof. In some cases, the feedstock is inoculated in response to the monitoring of the feedstock.

In some cases, the biological inoculant is rhizosphere soil obtained from the rhizosphere surrounding a plant. In some cases, the rhizosphere soil is obtained from within 200 km, e.g. within 50 km, or less of the soil location. In some cases, the biological inoculant is one or more microbes isolated from rhizosphere soil obtained from the rhizosphere surrounding a healthy plant located within 200 km, e.g. within 50 km, of the soil location. In some cases, the rhizosphere soil is obtained from the rhizosphere surrounding a plant, e.g. a healthy plant, located within 200 km, e.g. within 50 km, or less of the soil location. In some cases the plant is a species planned to be grown, or currently being grown, at the soil location. In some cases, the plant planned to be grown, or currently being grown, at the soil location is corn, wheat, rice, potato, or soy. The biological inoculant can include one or more of a fungus, protozoa, rotifer, bacterium, and nematode.

In some cases, the biological inoculant is a laboratory microbe, i.e., an isolated microbe obtained from a laboratory. In such cases, the culturing may result in the laboratory microbe adapting to the culturing environment and the resulting soil fertility composition includes the laboratory microbe. Exemplary laboratory microbes include *Bacillus* bacteria, *Glomus* fungi, and *Trichoderma* fungi. In some cases, the biological inoculant includes two or more laboratory microbes, e.g., a composition that includes two or three of *Glomus* fungi, *Bacillus* bacteria, and *Trichoderma* fungi.

In some cases, the inoculant includes a microbe that was not detected in the soil during the assessing step. In some cases, the inoculant includes a microbe was detected in the soil during the assessing step in an amount determined to be less than a desirable amount of the microbe. The desirable amount of the microbe can be determined based on one or more of: a) a soil parameter other than the amount of the microbe; b) the identity of a plant planned to be grown in the soil; c) the average rainfall pattern, temperature pattern, sunlight pattern, humidity pattern, wind pattern, or a combination thereof at the soil location; and d) the time of year that the soil fertility composition is planned to be applied to the soil.

The inoculating can be performed at any suitable time during the culturing step, such as before the thermal composting step, during the thermal composting step, after the thermal composting but before the cooling, during the cooling, after the cooling but before the adding worms, during the adding worms, or during the continuing to culture the feedstock. Inoculation can also be performed two or more times.

Ultrasound

The culturing step can include contacting the feedstock with ultrasound. For instance, the ultrasound can be intermittent ultrasound with a low frequency in the range of 20 kHz to 100 kHz. As used herein, "intermittent" means that the ultrasound is applied for a time, stopped, and then applied for an additional time. The cycle of application and stopping the ultrasound can continue for 2 or more cycles, such as 10 or more cycles, or 100 or more cycles. The ultrasound in some cases can modify which types of microbes grow in the feedstock, e.g. by affecting the cell walls to allow increased absorption of nutrients or to rupture cell walls leading to cell death. An exemplary publication describing how ultrasound can affect bacteria is Cai et al (BioMed Research International, 2017, doi: 10.115/2017/ 2317846, "A Review of the Combination Therapy of Low Frequency Ultrasound with Antibiotics), which is incorporated herein by reference. In addition, the ultrasound can increase the rate of bacterial growth. Additional references describing the effects of ultrasound on microbial death and growth are Pitt et al (Biotechnology Progress, 2003, 19, 3, 1038, doi: 10.1021/bp0340685), Chisti (Trends in Biotechnology, 2003, 21, 2, doi:10.1016/S0167-7799(02)00033-1), and Matsuhashi et al (Journal of General and Applied Microbiology, 1998, 44, 49, doi: 10.2323/jgam.44.49), which are incorporated herein by reference.

Growing a Plant in the Feedstock

The culturing step can also include growing a plant in the feedstock, e.g. during the continuing to culture step. For instance, the plant can be from the same species as the plant planned to be grown at the soil location. If the soil location is planned for soybeans, then a soybean plant can be grown in the feedstock. In some cases, this can cause the microbial community in the feedstock to be adapted to the soybean species. The plant can be grown from seed or by transplanting an existing plant, which can have an additional advantage of introducing microbes from the rhizome associated with the plant roots.

Aeration

The culturing step can include aerating the feedstock, such as by using a fan to direct air through the feedstock. The fan can blow air towards the feedstock or suck air away from the feedstock. In some cases, the fan is positioned above the feedstock and draws air upwards and through the feedstock. In some embodiments, the air is directed through a filter before it contacts the feedstock. In some cases, this filter provides an advantage by removing microbes from the air, thereby aerating the feedstock without introducing outside microbes or excessively modifying the microbe community. The filter can retain dust particles that the microbes can be present on. For instance, the filter can be a High Efficiency Particulate Air (HEPA) filter that removes 99.97% or more of 3.0 μm diameter airborne particles according to the DOE-STD-3020-2015 standard from the United States Department of Energy.

Generating and Applying Steps

After the culturing step, which results in a culturing product, a soil fertility composition is generated from the culturing product. This generating step refers to the physical production of a soil fertility composition. For example, the culturing product can be mixed with water in order to form a soil fertility solution or suspension. In other cases the culturing product is merely removed from the culturing location in order to generate the soil fertility composition.

The soil fertility composition can be applied to the soil at the soil location in any suitable manner. If the soil fertility composition is a solution or suspension, e.g. with water, the composition can be sprayed onto the plants, irrigated at ground level, or irrigated into the soil below ground level. If the soil fertility composition is a solid, or predominantly a solid, then the composition can be physically mixed into the soil at the soil location. The soil fertility composition can be added by hand, with electrically powered or internal combustion powered equipment, or in any other manner.

Repeating the Steps of the Methods

Provided are methods wherein the assessing, aerobic culturing, generating, and applying are repeated one or more times. For example, after the soil fertility composition is applied a first time, a second assessing step can be conducted. The second assessing step can be any suitable amount of time after the first application step, e.g., 1 day to 360 days, such as 90 days to 270 days. Stated in another manner, the waiting time period can be any suitable amount of time after the first application step, e.g., 1 day to 360 days, such as 90 days to 270 days. In some cases, the second assessing is conducted 180 or more days after the first application, such as 270 or more days, 360 or more days, 540 or more days, or 720 or more days. Based on the second assessing, the second aerobic culturing can be modified to further increase the fertility of the soil.

In some cases, biological parameter of the second assessing is the ratio of bacteria to fungi in the soil by mass, wherein the ratio increased or decreased by 50% or more between the first assessing and the second assessing, such as 75% or more, 100% or more, or 200% or more.

In some cases, the parameter of the second assessing changes by 10% or more compared to the same parameter being assessed during the first assessing, such as by 25% or more, 50% or more, 75% or more, 100% or more, or 200% or more.

Systems

Also provided are systems for aerobically culturing a feedstock to produce a culturing product. In some cases, the system includes:

a) two or more subunits that each comprise: (i) one or more side panels; (ii) an open top; (iii) a bottom comprising a bottom door; (iv) a first attachment member for lifting the subunit; (v) a second attachment member for connecting the subunit to another subunit;

b) a base configured such that the two or more subunits can sit on top of the base; and c) a top configured to sit on top of and cover the two or more subunits;

wherein each subunit can be removed from the system independently such that a unit not removed from the system can continue to produce a culturing product.

Exemplary System

Figure 3:
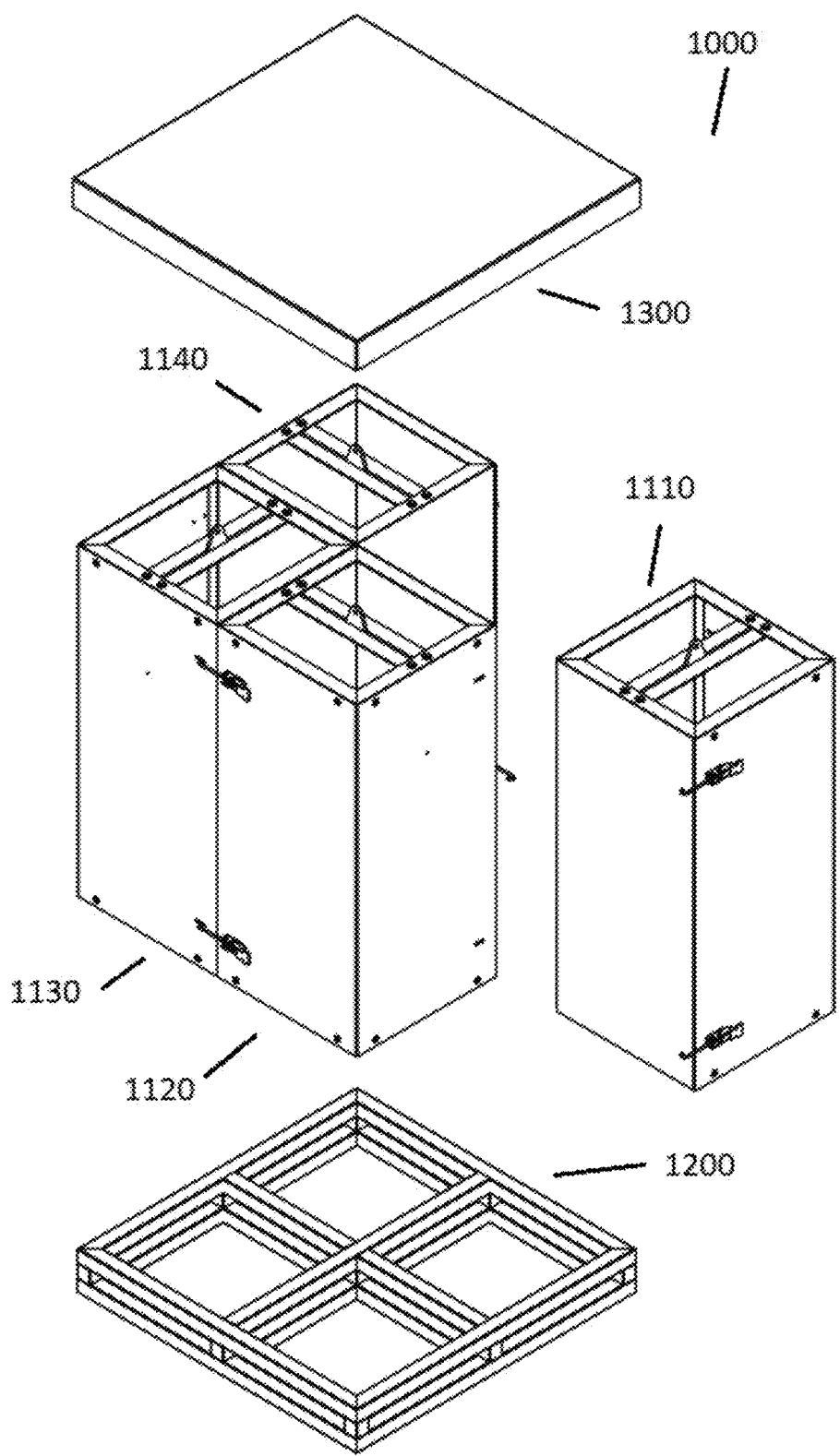
FIG. 3 shows an exploded view of a system including four subunits, a base, and a top.

An exploded view of an exemplary system 1000 that can be used with the methods described herein is show in FIG. 3. The FIG. 3 system includes four subunits 1110, 1120, 1130, and 1140, base 1200 and top 1300.

Figure 4:
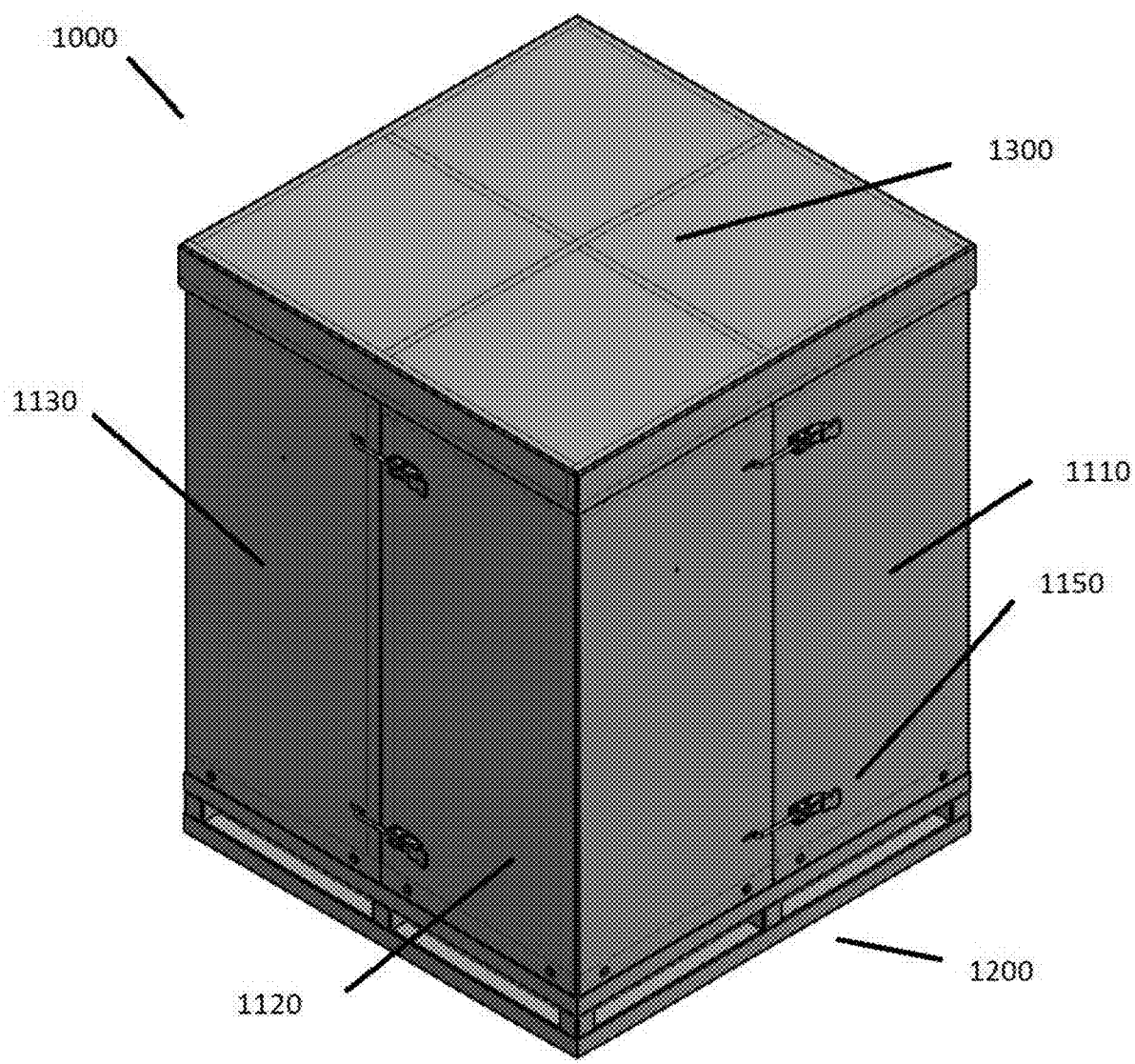
FIG. 4 shows an assembled view of FIG. 1 system.

As shown in FIG. 4, the subunits 1110, 1120, 1130, and 1140 can be placed on base 1200 and linked to one another using the attachment members 1150. Next, top 1300 was placed on top of the subunits, thereby covering them and forming a completed system.

Figure 5:
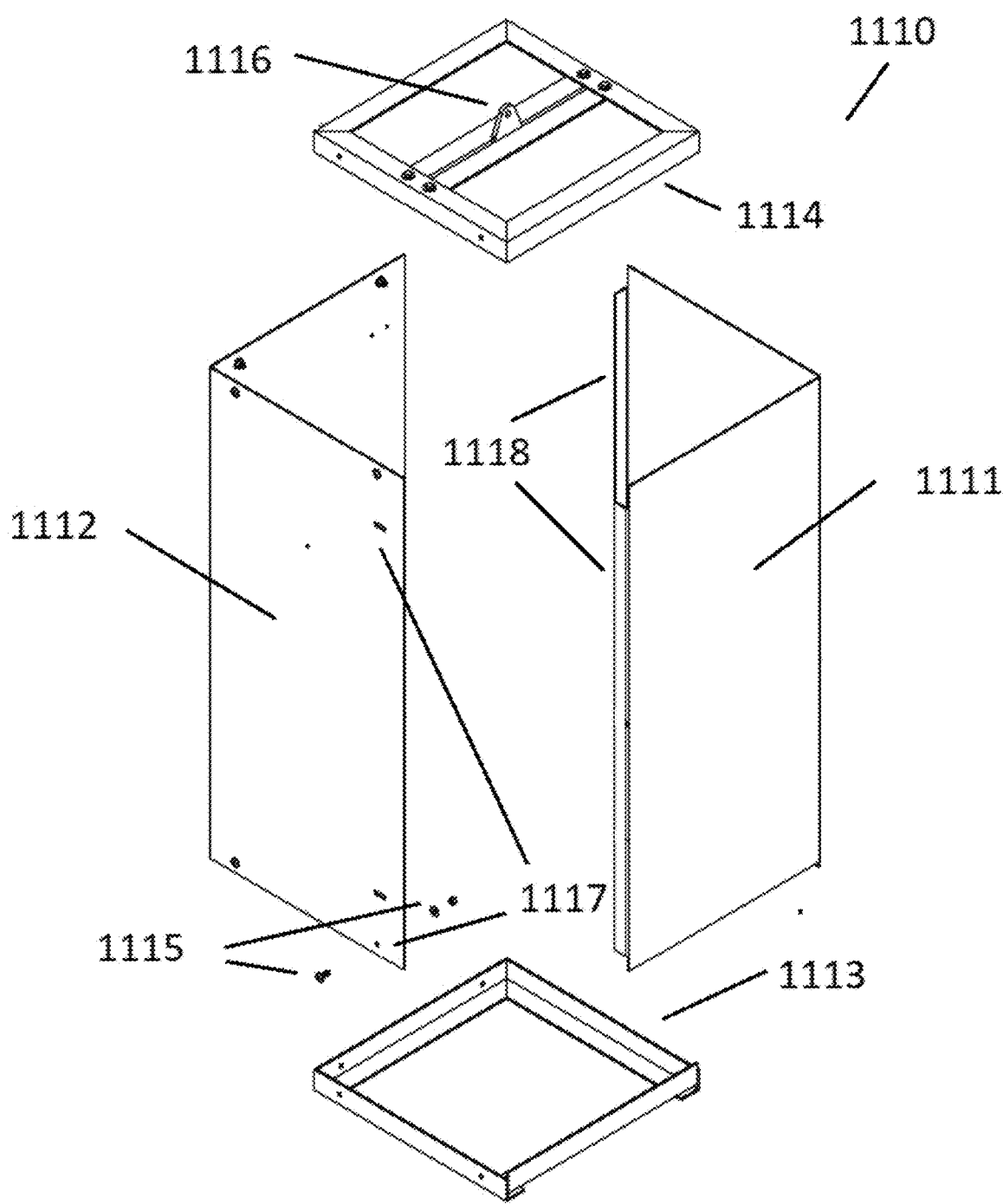
FIG. 5 shows the individual elements of each subunit.

As shown in FIG. 5, each subunit includes side panels 1111 and 1112 that are connected to another through attachment members 1115, which are bolts, washers, and nuts. The attachment members 1115 include insertion through holes 1117. In particular, flanges 1118 cause the panels to overlap and help hold the panels in place relative to one another. Each subunit includes bottom 1113 that the side panels are placed onto and then connected to with additional bolts, washers, and nuts (not shown). Bottom 1113 includes a frame (shown) that has an opening, allowing for installation of the bottom door (not shown). Each subunit also includes subunit top, which includes subunit top frame 1114 which is bolted to the side panels and subunit top lifting member 1116. Subunit top frame 1114 has two openings that are separated from one another by the lifting member 1116. Feedstock and optionally other components, e.g., water, can be added through the two openings. Optionally the subunit can be lifted by exerting a force on the lifting member.

As shown in FIG. 5, each of the elements are connected to one another through attachment members 1115 utilizing holes 1117. For example, even though not labeled in FIG. 5, holes are present in top frame 1114 and panel 1112 that allow attachment members to connect the frame to the panel. However, any manner of attachment between elements can be used, such as bolts, screws, nuts, washers, welds, adhesives, tongue-and-groove joints, split pin (i.e., cotter pin) magnetism, clamp, spring pin, linchpin, cotter circle, and fastener. As shown in FIG. 5, flanges 1118 do not extend the full length of the side panels in order to prevent potential physical impediment of motion with the subunit top or the subunit base.

Figure 6A:
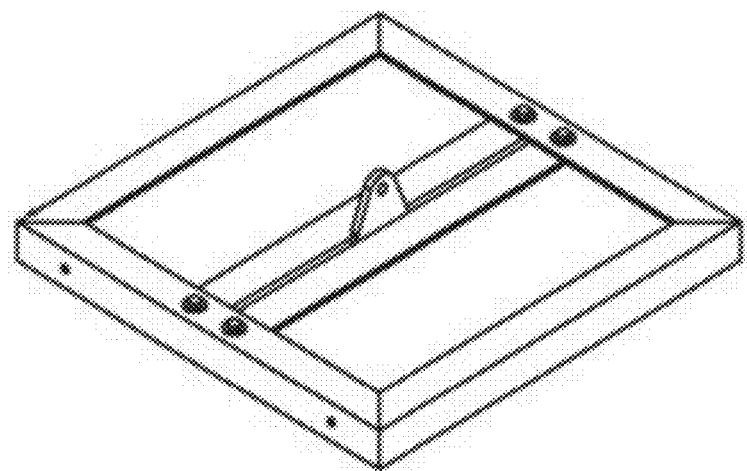
FIG. 6A shows an enlarged view of a subunit top and its constituent elements.

FIG. 6A shows an enlarged view of subunit top frame 1114 and subunit top lifting member 1116. Although a particular configuration is shown in FIG. 6A, and suitable lifting member and manner of attaching the lifting member to the remainder of the subunit can be employed.

Figure 6B:
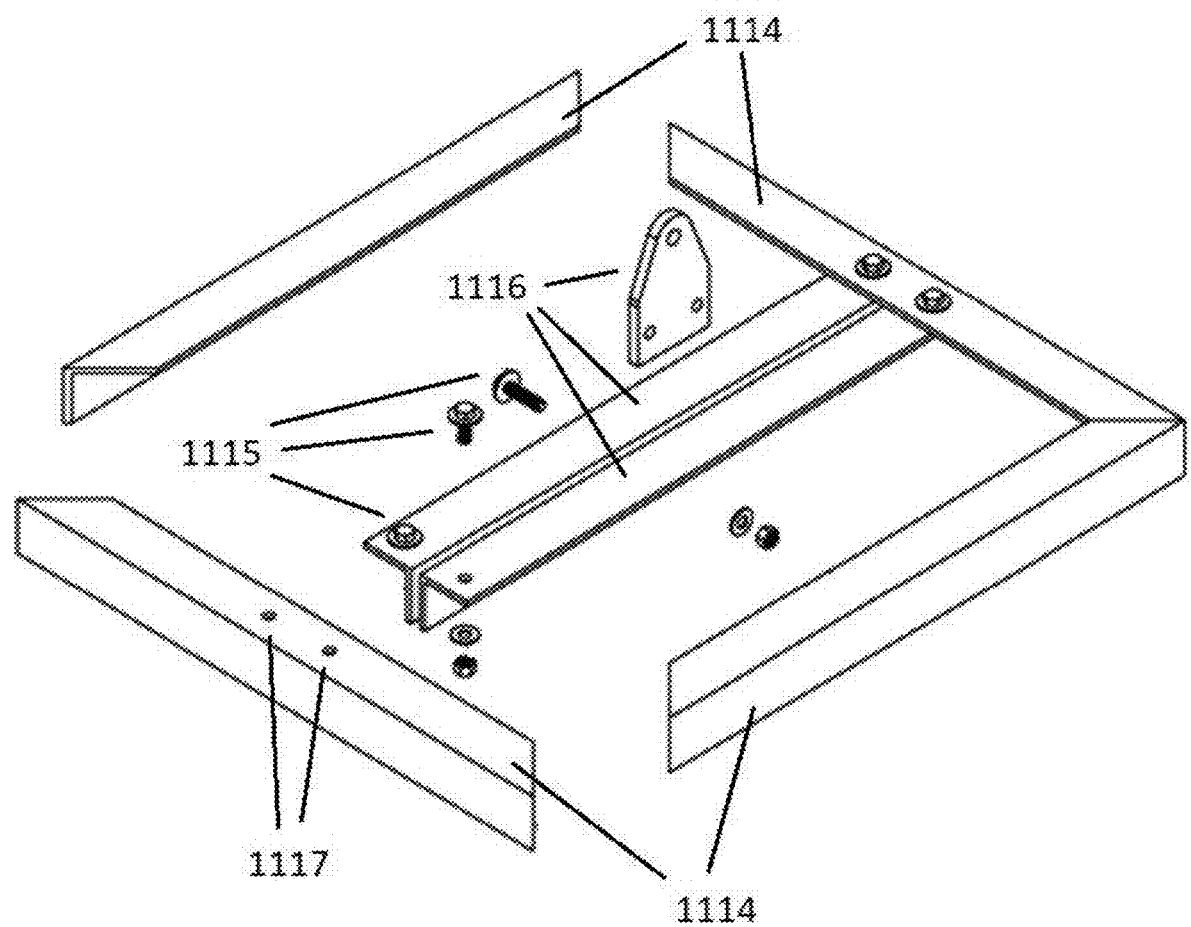
FIG. 6B shows an enlarged side view of the lifting attachment point of the subunit top.

As shown in FIG. 6B, frame 1114 includes four individual members of each dimensions, wherein each member includes a bend of 90 degrees. The members of the frame are bolted together. In addition, lifting member 1116 includes a lifting piece and two cross members. Each cross member has a 90 degree bend and holes to allow for bolts and nuts to attach the members to the frame 1114. The cross members are both bolted below the corresponding members of the frame, such that and upward force on the cross members will push the members towards the frame instead of away from the frame. Thus, the strength of the connection between the cross members and the frame is determined by the strength of the pieces and not by the bolts connecting them. In addition, the lifting piece is located between the two cross members and bolted to each cross member. Lifting the subunit includes exerting a force on the lifting piece, such as by placing a hook, wire, cable, or chain through the hole at the top of the lifting piece.

Figure 6C:
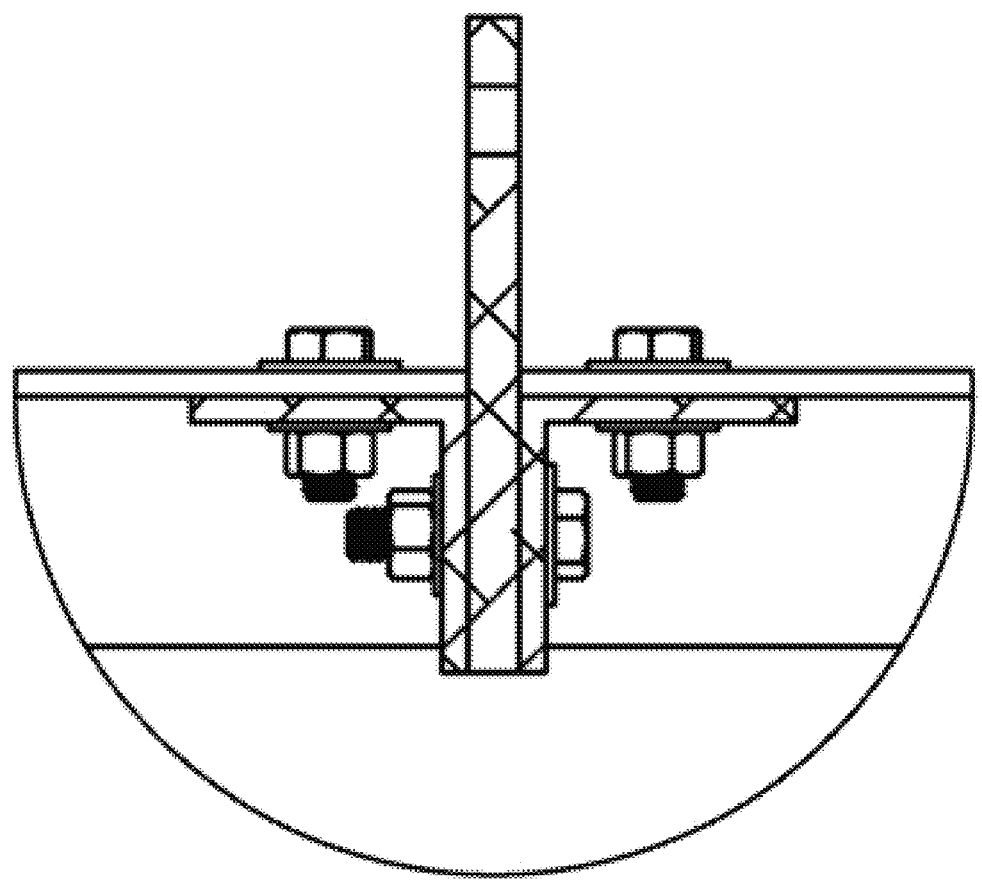
FIG. 6C shows an enlarged view of a connection of FIG. 6A.

FIG. 6C shows a side view of the lifting attachment point of lifting member 1116 and how the arrangement of bolts, nuts, and bracing members give high strength to the lifting member. This arrangement imparts the necessary strength to allow the subunit to be lifted even when containing a large amount of feedstock and water. In particular, a 90 degree brackets are included in order to securely attach the lifting piece to the cross members with bolts and nuts.

Figure 7:
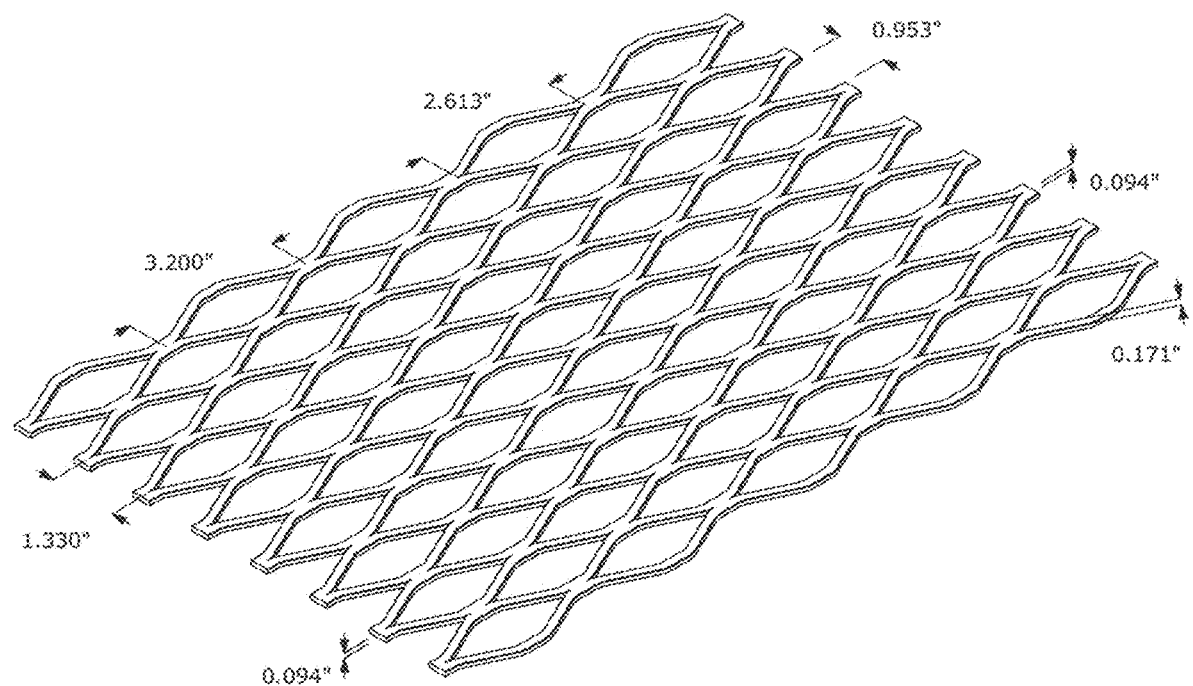
FIG. 7 shows a filtration membrane that was attached to the bottom of the system to allow for filtration of the feedstock after the culturing step is completed.

FIG. 7 shows the filtration membrane that that was attached to the bottom of the system to allow for filtration of the feedstock after the culturing step is completed. The dimensions shown in FIG. 7 are listed in inches. Although not shown in the FIG. 7 embodiment, in some cases the filtration membrane is also a side wall or attached to a side wall.

Figure 8A:
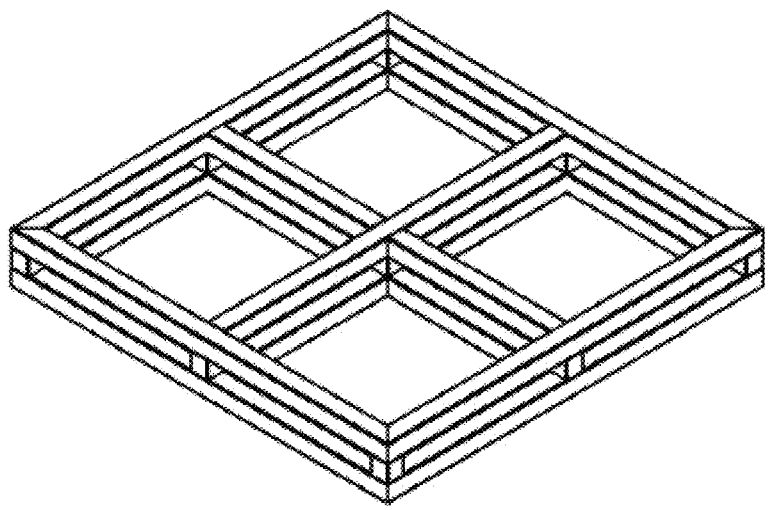
FIG. 8A shows an enlarged side view of a base.
Figure 8B:
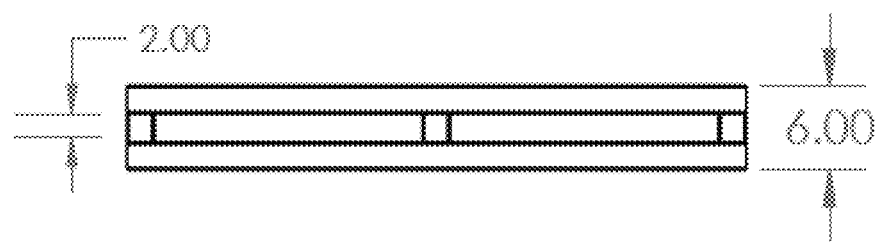
FIG. 8B shows a side view of a base.
Figure 8C:
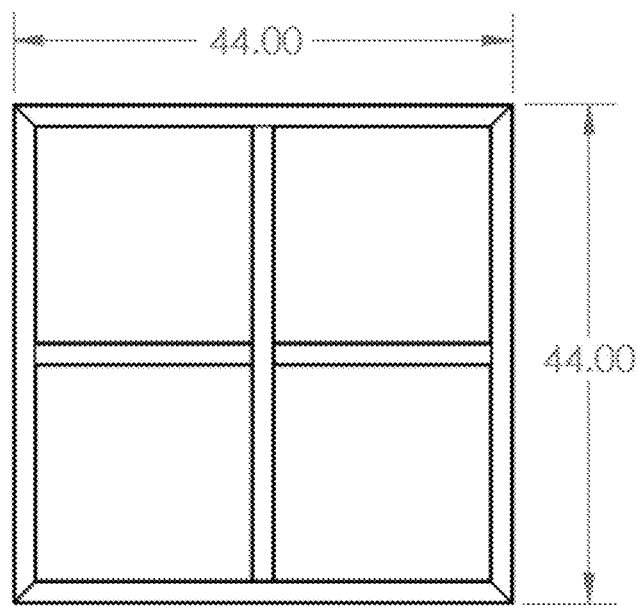
FIG. 8C shows a top-down view of a base.

FIG. 8A shows an enlarged angled view of base 200. FIG. 8B shows a side view of base 200, wherein the total height of base 200 is 6.00 inches and the size of the horizontal opening is 2.00 inches high. FIG. 8C shows a vertical view of base 200, showing 44.00 inch by 44.00 inch outer dimensions and four interior openings, i.e., that align with the bottom door of each subunit.

Dimensions of Systems

The systems and components thereof can have any suitable dimensions.

In an exemplary embodiment, the overall assembled system has a length of about 44 inches, a width of about 44 inches, and a height of about 57 inches. Each subunit has a length of about 22 inches, a width of about 22 inches, and a height of about 51 inches. Each subunit top can have a height of about 5 inches, which is included in the about 51 inch height of the overall subunit. The base can have a width of about 44 inches, a length of about 44 inches, and a height of about 6 inches. The top can have dimensions of about 45 inches long, about 45 inches wide, and about 4 inches high.

In some cases, the subunits have assembled length ranging from 15 inches to 150 inches, such as from 25 inches to 100 inches or from 35 inches to 75 inches. In some cases, the subunits have overall assembled width ranging from 15 inches to 150 inches, such as from 25 inches to 100 inches or from 35 inches to 75 inches. In some cases, the width and length of system are within 5% or less of one another. In other cases, the width and length of the system is more than 5% different.

In some cases, the subunits have assembled height ranging from 15 inches to 250 inches, such as from 25 inches to 200 inches, from 40 inches to 150 inches, or from 50 inches to 100 inches.

It is to be understood that the terms length, width, and height refer to the perspective from which the system is viewed. Such dimensions can also be referred to as a first dimension, a second dimension, and a third dimension.

The embodiments shown in FIGS. 3, 4, and 5 have parallelogram shapes, e.g., squares and rectangles. However, any suitable shapes of each component may be employed.

As shown in FIGS. 8A, 8B, and 8C, the base may have overall width and length of about 44 inches. The base may have an overall height of about 6 inches. The base can be constructed wherein a void is present in the region of the opening in the bottom of each subunit, and the remaining space is occupied by members of the base. Such an arrangement allows structural integrity of the base while also allowing feedstock to be allowed to fall through the base if a bottom door on each subunit is employed. The base can be constructed of horizontal members each about 2 inches high, with gaps between the top most and bottom most members to reduce weight of the base. The base generally has a length and width comparable, or in some cases within 2% of, to the dimensions of the subunits arranged together. In some cases, the base has a length ranging from 10 inches to 150 inches, such as from 20 inches to 75 inches or from 30 inches to 50 inches. The base can have a height ranging from 0.5 inches to 20 inches, such as from 1 inches to 15 inches or from 3 inches to 9 inches.

Figure 8D:
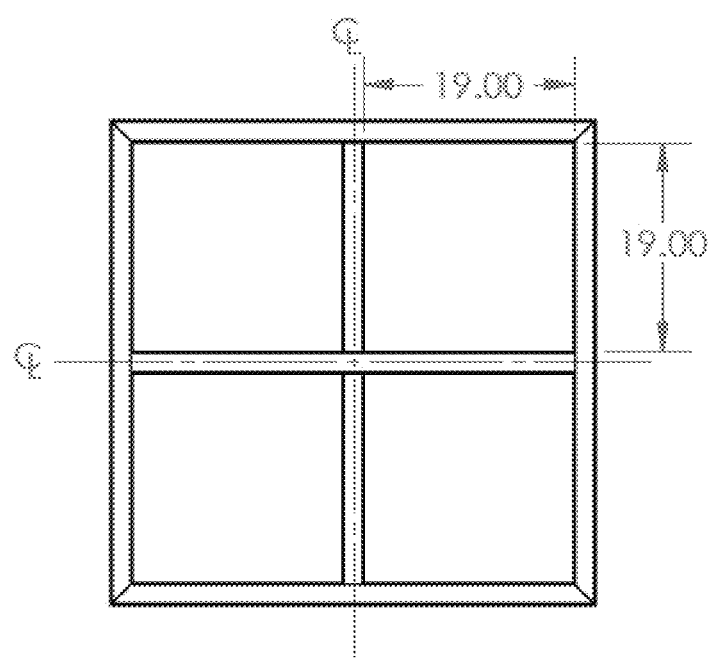
FIG. 8D shows another top-down view of the base.
Figure 9A:
FIG. 9A shows rows of feedstock that are covered by a roof during the thermal composting step.
Figure 9B:
FIG. 9B shows a user preparing plant material feedstock for the aerobic culturing step.
Figure 9C:
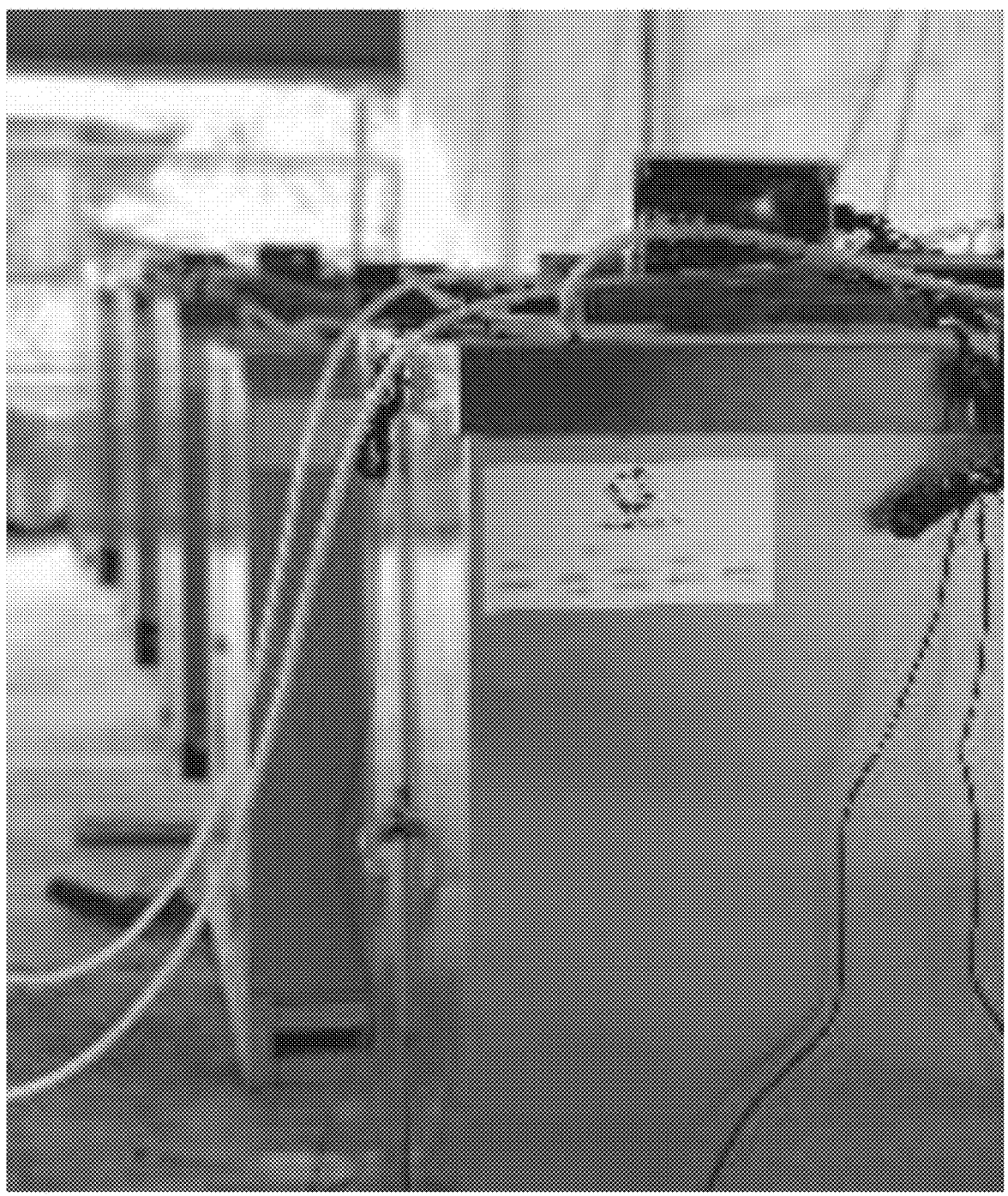
FIG. 9C shows five systems arranged at progressively greater distances from the camera. As most clearly shown for the closest system, each system has hoses that connect a reservoir of liquid to a particular subunit so that an electromechanical device can dispense some of the liquid to the feedstock in a particular subunit.

As shown in FIG. 8D, the base can have an opening of about 19 inches to about 19 inches. In such a case, the members can have widths of about 2 inches. The width of the members can range from, for example, 0.5 inches to 5 inches, 1 inch to 4 inches, or 1.5 inches to 3 inches. The openings are generally about the same size, shape, and dimensions as an opening in the base of the subunit. For example, the openings in the base can range from about 5 inches to about 50 inches, such as 10 inches to 35 inches or 15 inches to 25 inches.

In some cases, the elements of the base are welded to one another. In other cases, the elements of the base are connected to one another by bolts or screws and nuts. In other cases, the elements are connected by an adhesive.

Any suitable number of subunits may be employed. As shown in FIG. 3, in some cases the number of subunits is four. The number of subunits can be 1 in some cases. The number of subunits can be 2 or more in some cases, such as 3 or more, 5 or more, or 10 or more. The subunits shown in FIG. 3 are connected in a grid pattern of two subunits by two subunits. Any suitable pattern of subunits can be employed. For example, if the subunits have the shape of hexagons, then the subunits can be arranged in a pattern such that there is essentially no space between the subunits. The subunits can also be oriented in any suitable manner. For example, the cross members in FIG. 3 are shown as oriented in an alternating fashion. The subunits can be oriented in such a manner, with parallel cross members, or in any other suitable manner.

In some cases, one or more elements of the subunits are metal or a metal alloy. In such cases, the metal or metal alloy elements have thicknesses ranging from, for example, 0.05 inches to 0.5 inches, such as from 0.10 inches to 0.35 inches.

Inoculation Between Subunits

The systems can also include two internal side panels and two external side panels, wherein each external panel forms a portion of the exterior of the system and is impermeable to air and water, wherein each internal panel is permeable to microbes and is in contact with an internal panel of another subunit.

In such cases, the methods can include the inoculation of an un-inoculated feedstock in a first subunit by a feedstock in a second subunit. As an example, the first feedstock can be placed into the first subunit, where it undergoes thermal composting, cooling, and addition of worms. The first feedstock can either be partially cultured, i.e. not yet ready for the generation of a soil fertility composition, or fully cultured, i.e. ready for generation of a soil fertility composition. Afterwards, a second feedstock can be added to a second subunit. In some cases, the second feedstock is added to the second subunit in 1 day or less since the subunit was emptied, such as 1 hour or less. Since the internal side panels are in contact with one another and the internal side panels are permeable to microbes, the cultured feedstock in the first subunit can inoculate the feedstock in the second subunit with the microbes present in the first subunit. Afterwards, the first subunit can be removed from the system and the first feedstock can be used to generate a soil fertility composition. As such, sequential inoculations between subunits can be performed, e.g., the second subunit can inoculate a third subunit, and a third subunit can inoculate a fourth subunit.

Additional Elements

In some cases, one or more of the side panels, open top, bottom, first attachment member, and second attachment member are made of a metal or a metal alloy. In some cases, all of such elements are made of metal or a metal alloy.

In some cases, the thermal composting and cooling steps are performed outside the subunits. In fact, the thermal composting and cooling steps can be performed at a different facility or location from the system. In such cases, the feedstock can then be moved into the subunits, either before or after addition of worms, and the continuing to culture step can be performed. In other cases all the steps of the culturing will be performed wherein the feedstock remains in a single subunit of the system.

For clarity, the two or more subunits described above can be referred to as including a first subunit and a second subunit.

Electronic sensors and electromechanical addition elements can also be part of the systems. For instance, the system can further comprise a first electronic sensor configured to monitor a parameter of a feedstock located within the first subunit. Exemplary parameters include moisture; pH; and concentration of nitrogen, phosphorous, potassium, calcium, magnesium, or a combination thereof. The system can also include a first electromechanical device configured to add a liquid to the feedstock in the first subunit based on a signal from the electronic sensor, a pre-determined schedule, or a command from a user.

For instance, if the first electronic sensor detects that the pH is higher than a desired range, e.g. the pH is 8.1 and the maximum desired pH is 8.0, then the electronic sensor can direct the electromechanical device to add a liquid that includes an acid, such as hydrochloric acid, thereby reducing the pH to the desired range, e.g. 7.9. In another case, the electronic sensor does not directly cause the addition of the liquid, but rather provides an active or passive notification to a human user. Upon reviewing the notification, the human user can then direct the electromechanical device to add the liquid, thereby returning the feedstock to the desired range.

The system can also include a second sensor that monitors a second subunit, and optionally a second electromechanical device. In fact, any number and combination of sensors and electromechanical addition devices can be included in the system, thereby monitoring any number of different parameters in any number of different subunits. In some cases, the system comprises an electromechanical addition device configured to selectively add a liquid to a first subunit but not a second subunit.

In some cases, the system includes a moisture sensor, a water addition element, or a combination thereof. In some cases, the water addition element is operatively connected to the moisture sensor and configured to automatically add water based upon a signal from the moisture sensor. As such, the methods can involve monitoring and additions that employ such elements. The systems might also include elements for addition of any other substance, e.g., microbe food or inoculants. In some cases, the microbe food addition element is configured to automatically add microbe food based on a schedule.

Ultrasound generators can also be included in the system. These ultrasound generators can be configured to generate ultrasound that contacts the feedstock in one or more of the subunits, e.g. independently contact each subunit.

The system can further include a fan for directing air through a subunit. For instance, the fan can draw air upwards through the subunit. The system can include a filter, e.g. a High Efficiency Particulate Air (HEPA) filter that removes 99.97% or more of 3.0 μm diameter airborne particles according to the DOE-STD-3020-2015 standard from the United States Department of Energy. The filter can remove dust particles than can have microbes attached thereon. As such, by removing microbes from the air, the filter can reduce any changes in the microbial community in the feedstock due to introduction of the air.

The system can also include filtration membrane operatively connected to one of the two or more subunits, wherein the bottom door is positioned adjacent to the filtration membrane such that a culturing product in the subunit can be filtered. The system can further comprise a vibration device that is able to vibrate the filtration membrane. In some cases, the vibration device is able to vibrate the filtration member at a frequency of 30 to 300 vibrations per minute, such from 60 to 150 vibrations or from 90 to 120 vibrations. In other cases, the vibration device vibrates at a frequency ranging from 1,000 vibrations per minute to 50,000 vibrations per minute, such as 5,000 vibrations per minute to 20,000 vibrations per minute.

In some cases the culturing is indoors. In other cases the culturing is outdoors.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric. Standard abbreviations may be used, e.g., bp, base pair(s); kb, kilobase(s); pl, picoliter(s); s or sec, second(s); min, minute(s); h or hr, hour(s); aa, amino acid(s); nt, nucleotide(s); and the like.

Example 1: Assessing Bacterial and Fungal Content

The relative amount of different species of bacteria and fungi in a sample soil at a sample soil location were determined as part of an assessing step described above. 351 bacterial species and 109 fungal species were detected in the relative amounts shown in Tables 1 and 2 below.

TABLE 1

Fungal species in a sample soil

| Fungal Species | Amount (%) | Fungal Species | Amount (%) |
| --- | --- | --- | --- |
| Aspergillus fumigatus | 32.656 | Debaryomyces hansenii | 0.042 |
| Mycothermus thermophilus | 11.927 | Massarina sp. | 0.042 |
| Zopfiella sp. | 10.303 | Aspergillus flavus | 0.037 |
| Penicillium ilerdanum | 10.278 | Acremonium sp. | 0.035 |
| Epicoccum nigrum | 5.339 | Penicillium coffeae | 0.032 |
| Penicillium purpurogenum | 3.938 | Sagenomella sp. | 0.030 |
| Coprinopsis calospora | 3.894 | Talaromyces aurantiacus | 0.028 |
| Penicillium citrinum | 3.102 | Myceliophthora sp. | 0.028 |
| Ascobolus sp. | 2.184 | Microascus brevicaulis | 0.028 |
| Thermomyces lanuginosus | 1.853 | Metarhizium anisopliae | 0.025 |
| Coprinus annuloporus | 1.357 | Penicillium simplicissimum | 0.025 |
| Phaeomoniella chlamydospora | 0.899 | Custingophora olivacea | 0.025 |
| Aspergillus piperis | 0.737 | Cryptococcus magnus | 0.025 |
| Microascus sp. | 0.732 | Aspergillus sp. | 0.023 |
| Mortierella wolfii | 0.695 | Mortierella sp. | 0.023 |
| Penicillium anatolicum | 0.558 | Phialophora geniculata | 0.021 |
| Paraconiothyrium brasiliense | 0.544 | Lecanicillium saksenae | 0.021 |
| Aspergillus terreus | 0.493 | Pichia manshurica | 0.019 |
| Wallemia sebi | 0.459 | Acremonium stromaticum | 0.019 |
| Hydropisphaera sp. | 0.440 | Nakazawaea ishiwadae | 0.016 |
| Issatchenkia orientalis | 0.410 | Capnodium sp. | 0.016 |
| Botrytis cinerea | 0.387 | Aspergillus melleus | 0.016 |
| Cryptococcus diffluens | 0.380 | Thermomucor indicae-seudaticae | 0.014 |
| Aspergillus insuetus | 0.373 | Podospora dimorpha | 0.014 |
| Penicillium sumatrense | 0.368 | Aspergillus caesiellus | 0.012 |
| Metschnikowia pulcherrima | 0.352 | Aspergillus ochraceus | 0.012 |
| Cladosporium herbarum | 0.352 | Acremonium persicinum | 0.012 |
| Cephalosporium serrae | 0.352 | Myriococcum sp. | 0.012 |
| Scedosporium prolificans | 0.341 | Candida intermedia | 0.012 |
| Aspergillus sclerotiorum | 0.317 | Sporothrix sp. | 0.012 |
| Acremonium hennebertii | 0.308 | Stachybotrys echinata | 0.012 |

TABLE 1-continued

Fungal species in a sample soil

| Fungal Species | Amount (%) | Fungal Species | Amount (%) |
|---|---|---|---|
| *Penicillium terrigenum* | 0.273 | *Myrothecium cinctum* | 0.012 |
| *Tetracladium* sp. | 0.250 | *Ceratocystis paradoxa* | 0.009 |
| *Trechispora* sp. | 0.248 | *Geosmithia* sp. | 0.009 |
| *Penicillium paxilli* | 0.211 | *Hyphopichia burtonii* | 0.009 |
| *Filobasidium floriforme* | 0.195 | *Aspergillus bombycis* | 0.009 |
| *Aspergillus sydowii* | 0.174 | *Penicillium georgiense* | 0.009 |
| *Aspergillus flocculosus* | 0.155 | *Aspergillus brasiliensis* | 0.005 |
| *Cladosporium sphaerospermum* | 0.130 | *Rhodosporidium babjevae* | 0.005 |
| *Spiromastix warcupii* | 0.116 | *Alternaria alternata* | 0.005 |
| *Pilobolus longipes* | 0.111 | *Penicillium brevicompactum* | 0.002 |
| *Chrysosporium* sp. | 0.109 | *Aureobasidium pullulans* | 0.002 |
| *Hanseniaspora uvarum* | 0.102 | *Ulocladium chartarum* | 0.002 |
| *Arachnotheca glomerata* | 0.100 | *Mortierella elongata* | 0.002 |
| *Beauveria* sp. | 0.093 | *Mortierella rishikesha* | 0.002 |
| *Cryptococcus aerius* | 0.081 | *Cladosporium cladosporioides* | 0.002 |
| *Paraphaeosphaeria* sp. | 0.069 | *Calvatia cyathiformis* | 0.002 |
| *Fusarium keratoplasticum* | 0.069 | *Talaromyces purpurogenus* | 0.002 |
| *Acremonium polychromum* | 0.065 | *Penicillium expansum* | 0.002 |
| *Penicillium sizovae* | 0.065 | *Selenophoma mahoniae* | 0.002 |
| *Penicillium menonorum* | 0.063 | *Aspergillus aculeatus* | 0.002 |
| *Isaria cateniannulata* | 0.056 | *Cryptococcus oeirensis* | 0.002 |
| *Wallrothiella subiculosa* | 0.053 | *Pyrenochaeta* sp. | 0.002 |
| *Exophiala exophialae* | 0.049 | *Leucoagaricus leucothites* | 0.002 |
| *Penicillium* sp. | 0.046 | | |

TABLE 2

Bacterial species in a sample soil

| Bacterial Species | Amount (%) | Bacterial Species | Amount (%) |
|---|---|---|---|
| *Escherichia* sp. | 7.661 | *Alterococcus* sp. | 0.045 |
| *Azospira* sp. | 6.518 | *Cellvibrio* sp. | 0.045 |
| *Planctomyces* sp. | 5.836 | *Fonticella* sp. | 0.045 |
| *Hyphomicrobium* sp. | 5.119 | *Arenimonas* sp. | 0.045 |
| *Chryseolinea* sp. | 4.788 | *Bythopirellula goksoyri* | 0.045 |
| *Nitrososphaera* sp. | 4.713 | *Fodinicola* sp. | 0.045 |
| *Roseiflexus* sp. | 3.861 | *Solibacter* sp. | 0.045 |
| *Bacillus* sp. | 3.705 | *Caulobacter* sp. | 0.040 |
| *Sphaerobacter* sp. | 3.078 | *Novosphingobium capsulatum* | 0.040 |
| *Chloroflexus* sp. | 2.156 | *Pseudomonas aeruginosa* | 0.040 |
| *Phycisphaera* sp. | 1.715 | *Tuberibacillus* sp. | 0.035 |
| *Pedomicrobium* sp. | 1.634 | *Nitriliruptor* sp. | 0.035 |
| *Planifilum* sp. | 1.504 | *Sulfobacillus* sp. | 0.035 |
| *Coxiella* sp. | 1.324 | *Arenibacter* sp. | 0.035 |
| *Gemmata* sp. | 1.284 | *Nocardioides* sp. | 0.035 |
| *Gemmatimonas* sp. | 1.123 | *Nitrosomonas communis* | 0.035 |
| *Nitrospira* sp. | 1.098 | *Rubrobacter* sp. | 0.035 |
| *Bauldia* sp. | 1.078 | *Blautia* sp. | 0.035 |
| *Pirellula* sp. | 1.023 | *Filomicrobium* sp. | 0.030 |
| *Nitrolancea* sp. | 0.993 | *Crocinitomix* sp. | 0.030 |
| *Novosphingobium* sp. | 0.968 | *Hepatincola* sp. | 0.030 |
| *Blastopirellula* sp. | 0.897 | *Rheinheimera* sp. | 0.030 |
| *Alysiosphaera* sp. | 0.897 | *Parvularcula* sp. | 0.030 |
| *Symbiobacterium thermophilum* | 0.867 | *Dichotomicrobium* sp. | 0.030 |
| *Blastocatella* sp. | 0.802 | *Silanimonas* sp. | 0.030 |
| *Rhodopirellula* sp. | 0.792 | *Atopococcus* sp. | 0.030 |
| *Clostridium* sp. | 0.757 | *Kiloniella* sp. | 0.030 |
| *Bdellovibrio* sp. | 0.732 | *Stackebrandtia* sp. | 0.030 |
| *Sufflavibacter* sp. | 0.732 | *Thioalkalispira* sp. | 0.030 |
| *Sandaracinus* sp. | 0.687 | *Metachlamydia elodeae* | 0.030 |
| *Pedosphaera parvula* | 0.682 | *Demequina* sp. | 0.025 |
| *Lysinibacillus* sp. | 0.627 | *Owenweeksia* sp. | 0.025 |
| *Steroidobacter* sp. | 0.617 | *Bradyrhizobium elkanii* | 0.025 |
| *Rhodoplanes* sp. | 0.617 | *Adhaeribacter* sp. | 0.025 |
| *Ohtaekwangia* sp. | 0.612 | *Gracilibacter thermotolerans* | 0.025 |
| *Thermobispora bispora* | 0.612 | *Acidovorax cattleyae* | 0.025 |
| *Geobacillus* sp. | 0.602 | *Ensifer meliloti* | 0.025 |
| *Bryobacter* sp. | 0.602 | *Pedobacter* sp. | 0.025 |

TABLE 2-continued

Bacterial species in a sample soil

| Bacterial Species | Amount (%) | Bacterial Species | Amount (%) |
|---|---|---|---|
| *Legionella* sp. | 0.547 | *Tepidanaerobacter* sp. | 0.025 |
| *Haliangium* sp. | 0.541 | *Sedimentibacter* sp. | 0.025 |
| *Iamia* sp. | 0.541 | *Butyrivibrio* sp. | 0.025 |
| *Thermobacillus* sp. | 0.501 | *Prosthecobacter* sp. | 0.025 |
| *Virgibacillus halodenitrificans* | 0.491 | *Saccharopolyspora emeiensis* | 0.025 |
| *Thermoflavimicrobium* sp. | 0.486 | *Caminicella* sp. | 0.025 |
| *Thermopolyspora* sp. | 0.451 | *Calditerricola* sp. | 0.020 |
| *Mariprofundus* sp. | 0.451 | *Algoriphagus* sp. | 0.020 |
| *Longispora* sp. | 0.446 | *Brevundimonas diminuta* | 0.020 |
| *Devosia insulae* | 0.441 | *Pseudonocardia* sp. | 0.020 |
| *Sorangium* sp. | 0.436 | *Alkaliphilus transvaalensis* | 0.020 |
| *Bacillus thermolactis* | 0.426 | *Pseudomonas* sp. | 0.020 |
| *Acidovorax* sp. | 0.426 | *Singulisphaera* sp. | 0.020 |
| *Thermoactinomyces* sp. | 0.421 | *Clostridium stercorarium* | 0.020 |
| *Lewinella* sp. | 0.416 | *Proteiniborus* sp. | 0.020 |
| *Litorilinea* sp. | 0.416 | *Alicyclobacillus* sp. | 0.020 |
| *Rhodomicrobium* sp. | 0.371 | *Bacillus alkalitelluris* | 0.020 |
| *Ardenscatena* sp. | 0.366 | *Acanthopleuribacter* sp. | 0.020 |
| *Xiphinematobacter* sp. | 0.326 | *Stella* sp. | 0.020 |
| *Pedosphaera* sp. | 0.311 | *Laceyella sacchari* | 0.020 |
| *Paenibacillus* sp. | 0.311 | *Hymenobacter* sp. | 0.020 |
| Flavobacterium sp. | 0.306 | *Oceanibaculum* sp. | 0.020 |
| *Bacillus foraminis* | 0.296 | *Liberibacter* sp. | 0.020 |
| *Pseudolabrys* sp. | 0.296 | *Fictibacillus barbaricus* | 0.020 |
| *Hirschia* sp. | 0.291 | *Bosea* sp. | 0.020 |
| *Pelagibius* sp. | 0.281 | *Metachlamydia lacustris* | 0.020 |
| *Symbiobacterium* sp. | 0.281 | *Nannocystis* sp. | 0.020 |
| *Truepera* sp. | 0.276 | *Marinoscillum* sp. | 0.015 |
| *Woodsholea* sp. | 0.271 | *Elioraea tepidiphila* | 0.015 |
| *Anaeromyxobacter* sp. | 0.266 | *Lysobacter* sp. | 0.015 |
| *Rhodobium* sp. | 0.256 | *Corynebacterium stationis* | 0.015 |
| *Saccharomonospora viridis* | 0.241 | *Luteivirga* sp. | 0.015 |
| *Glycomyces mongolensis* | 0.241 | *Captivus* sp. | 0.015 |
| *Bacillus aryabhattai* | 0.241 | *Taibaiella* sp. | 0.015 |
| *Bacillus aquimaris* | 0.241 | *Achromobacter xylosoxidans* | 0.015 |
| *Ilumatobacter* sp. | 0.236 | *Syntrophaceticus* sp. | 0.015 |
| *Marinicella* sp. | 0.236 | *Brevundimonas* sp. | 0.015 |
| *Thiothrix* sp. | 0.231 | *Intrasporangium* sp. | 0.015 |
| *Aquicella* sp. | 0.231 | *Inquilinus* sp. | 0.015 |
| *Tepidimicrobium* sp. | 0.221 | *Flavisolibacter* sp. | 0.015 |
| *Ignavibacterium* sp. | 0.216 | *Simkania negevensis* | 0.015 |
| *Bacillus muralis* | 0.216 | *Sneathiella* sp. | 0.015 |
| *Peredibacter* sp. | 0.211 | *Fodinicurvata fenggangensis* | 0.015 |
| *Ammoniphilus* sp. | 0.201 | *Gracilibacter* sp. | 0.015 |
| *Oceanobacillus* sp. | 0.201 | *Spirochaeta* sp. | 0.015 |
| *Patulibacter* sp. | 0.201 | *Pseudonocardia zijingensis* | 0.015 |
| *Bacillus decolorationis* | 0.201 | *Criblamydia sequanensis* | 0.015 |
| *Bythopirellula* sp. | 0.196 | *Actinomycetospora* sp. | 0.015 |
| *Altererythrobacter* sp. | 0.191 | *Methylocaldum* sp. | 0.015 |
| *Desulfitibacter* sp. | 0.186 | *Parvibaculum* sp. | 0.015 |
| *Thermomonospora curvata* | 0.186 | *Pleomorphomonas* sp. | 0.015 |
| *Aneurinibacillus* sp. | 0.165 | *Amaricoccus* sp. | 0.015 |
| *Methylohalomonas* sp. | 0.160 | *Brevibacterium aureum* | 0.015 |
| *Defluviicoccus* sp. | 0.160 | *Collinsella* sp. | 0.015 |
| *Coprococcus* sp. | 0.160 | *Pelagibacterium* sp. | 0.015 |
| *Microbispora* sp. | 0.155 | *Arthrobacter agilis* | 0.010 |
| *Microbacterium arthrosphaerae* | 0.155 | *Anaerobranca* sp. | 0.010 |
| *Caldalkalibacillus* sp. | 0.150 | *Shimazuella* sp. | 0.010 |
| *Phyllobacterium* sp. | 0.150 | *Bacillus gibsonii* | 0.010 |
| *Halocella* sp. | 0.150 | *Arenicella* sp. | 0.010 |
| *Caldicoprobacter* sp. | 0.150 | *Mesorhizobium tianshanense* | 0.010 |
| *Phaselicystis* sp. | 0.145 | *Pseudomonas citronellolis* | 0.010 |
| *Ornatilinea* sp. | 0.145 | *Smithella* sp. | 0.010 |
| *Rhodococcus* sp. | 0.130 | *Dehalobacter* sp. | 0.010 |
| *Euzebya* sp. | 0.130 | *Ornithinimicrobium* sp. | 0.010 |
| *Streptomyces* sp. | 0.130 | *Aeromicrobium* sp. | 0.010 |
| *Constrictibacter* sp. | 0.130 | *Gemella* sp. | 0.010 |
| *Hyphomonas* sp. | 0.125 | *Paracoccus chinensis* | 0.010 |
| *Variovorax* sp. | 0.120 | *Caldanaerocella* sp. | 0.010 |
| *Haloplasma* sp. | 0.120 | *Arthrobacter festucae* | 0.010 |
| *Azoarcus* sp. | 0.120 | *Smaragdicoccus niigatensis* | 0.010 |
| *Paucisalibacillus* sp. | 0.115 | *Anaerolinea* sp. | 0.010 |
| *Acidiferrobacter* sp. | 0.115 | *Alkaliphilus crotonatoxidans* | 0.010 |
| *Haloferula* sp. | 0.115 | *Catellatospora citrea* | 0.010 |
| *Lautropia* sp. | 0.110 | *Mesorhizobium* sp. | 0.010 |

TABLE 2-continued

Bacterial species in a sample soil

| Bacterial Species | Amount (%) | Bacterial Species | Amount (%) |
|---|---|---|---|
| *Chthoniobacter* sp. | 0.110 | *Protochlamydia* sp. | 0.010 |
| *Afifella* sp. | 0.110 | *Turneriella parva* | 0.010 |
| *Achromobacter* sp. | 0.105 | *Methanobacterium* sp. | 0.010 |
| *Opitutus* sp. | 0.100 | *Methanomassiliicoccus* sp. | 0.010 |
| *Nitrosococcus* sp. | 0.100 | *Promicromonospora kroppenstedtii* | 0.010 |
| *Criblamydia* sp. | 0.090 | *Rummeliibacillus* sp. | 0.010 |
| *Enhygromyxa* sp. | 0.090 | *Rhizomicrobium* sp. | 0.010 |
| *Luteimonas composti* | 0.090 | *Anaerostipes* sp. | 0.010 |
| *Actinopolyspora* sp. | 0.090 | *Mycobacterium* sp. | 0.010 |
| *Bacillus clausii* | 0.085 | *Longilinea* sp. | 0.010 |
| *Melghirimyces thermohalophilus* | 0.085 | *Rickettsia* sp. | 0.010 |
| *Fimbriimonas* sp. | 0.085 | *Leadbetterella* sp. | 0.010 |
| *Thermaerobacter marianensis* | 0.085 | *Luteolibacter* sp. | 0.010 |
| *Waddlia chondrophila* | 0.085 | *Tumebacillus ginsengisoli* | 0.005 |
| *Exiguobacterium sibiricum* | 0.085 | *Bacteroides* sp. | 0.005 |
| *Haliea* sp. | 0.080 | *Bdellovibrio bacteriovorus* | 0.005 |
| *Ureibacillus* sp. | 0.080 | *Thermocrispum municipale* | 0.005 |
| *Microthrix* sp. | 0.080 | *Thalassobaculum* sp. | 0.005 |
| *Phenylobacterium* sp. | 0.080 | *Tissierella* sp. | 0.005 |
| *Pseudospirillum* sp. | 0.080 | *Tumebacillus* sp. | 0.005 |
| *Thermasporomyces composti* | 0.075 | *Stenotrophomonas* sp. | 0.005 |
| *Cohnella arctica* | 0.075 | *Arthrobacter cereus* | 0.005 |
| *Reichenbachiella* sp. | 0.075 | *Sporomusa* sp. | 0.005 |
| *Reyranella* sp. | 0.075 | *Desulfobacca* sp. | 0.005 |
| *Agaricicola* sp. | 0.075 | *Paenibacillus alginolyticus* | 0.005 |
| *Sphingomonas* sp. | 0.075 | *Defluviitalea* sp. | 0.005 |
| *Sphaerisporangium rubeum* | 0.070 | *Odyssella* sp. | 0.005 |
| *Mycobacterium celatum* | 0.070 | *Deinococcus aquaticus* | 0.005 |
| *Coprothermobacter* sp. | 0.070 | *Amycolatopsis pigmentata* | 0.005 |
| *Devosia* sp. | 0.070 | *Nitrososphaera gargensis* | 0.005 |
| *Caldibacillus* sp. | 0.070 | *Dermatophilus crocodyli* | 0.005 |
| *Desulfotomaculum* sp. | 0.070 | *Massilia* sp. | 0.005 |
| *Gracilibacillus* sp. | 0.065 | *Corynebacterium* sp. | 0.005 |
| *Brevibacillus formosus* | 0.060 | *Martelella* sp. | 0.005 |
| *Brevibacillus* sp. | 0.060 | *Anaerosalibacter* sp. | 0.005 |
| *Methanobrevibacter* sp. | 0.060 | *Entotheonella* sp. | 0.005 |
| *Ferruginibacter* sp. | 0.060 | *Arthrobacter nitroguajacolicus* | 0.005 |
| *Phaeospirillum fulvum* | 0.060 | *Kocuria rhizophila* | 0.005 |
| *Gaiella* sp. | 0.060 | *Fluviicola* sp. | 0.005 |
| *Litorilinea aerophila* | 0.060 | *Halomonas* sp. | 0.005 |
| *Lutispora* sp. | 0.060 | *Paenibacillus taihuensis* | 0.005 |
| *Aeribacillus barengoltzii* | 0.060 | *Perlucidibaca* sp. | 0.005 |
| *Solirubrobacter* sp. | 0.055 | *Sporocytophaga* sp. | 0.005 |
| *Bradyrhizobium* sp. | 0.055 | *Algoriphagus terrigena* | 0.005 |
| *Actinomadura* sp. | 0.055 | *Sphingopyxis alaskensis* | 0.005 |
| *Portibacter* sp. | 0.055 | *Aerococcus viridans* | 0.005 |
| *Rubricoccus* sp. | 0.050 | *Skermanella* sp. | 0.005 |
| *Verrucomicrobium* sp. | 0.050 | *Simiduia* sp. | 0.005 |
| *Legionella londiniensis* | 0.050 | *Schlegelella* sp. | 0.005 |
| *Caldilinea* sp. | 0.050 | *Sanguibacter suarezii* | 0.005 |
| *Plesiocystis* sp. | 0.050 | *Salinicoccus* sp. | 0.005 |
| *Bacillus litoralis* | 0.050 | *Rhodococcus equi* | 0.005 |
| *Mycobacterium hassiacum* | 0.050 | *Clostridium intestinale* | 0.005 |
| *Bacillus aerophilus* | 0.050 | *Rhizobium* sp. | 0.005 |
| *Halorhodospira* sp. | 0.050 | *Pseudoxanthomonas mexicana* | 0.005 |
| *Tepidimicrobium ferriphilum* | 0.050 | *Cerasibacillus quisquiliarum* | 0.005 |
| *Desulfotomaculum peckii* | 0.045 | *Propionibacterium acnes* | 0.005 |
| *Luteimonas* sp. | 0.045 | *Pontibacter* sp. | 0.005 |
| *Marmoricola* sp. | 0.045 | *Phytohabitans* sp. | 0.005 |
| *Alkaliphilus oremlandii* | 0.045 | *Allokutzneria multivorans* | 0.005 |
| *Actinomadura bangladeshensis* | 0.045 | *Clostridium bowmanii* | 0.005 |
| *Thermomonas* sp. | 0.045 | | |

Example 2

Corn is the crop intended to be grown at the soil location. To facilitate optimal plant growth, the soil is analyzed for the amounts of various life forms, such as bacteria, fungi, protozoa, and nematodes. As shown in Table 3 below, the experimentally determined soil values are compared with the target soil values for growing corn. The values shown below are recited relative to one gram of soil.

TABLE 3

| Biomass | Actual Soil Value | Target Value |
|---|---|---|
| Bacteria (µg/g) | 250 | 300 |
| Fungi (µg/g) | 100 | 300 |
| Fungi:Bacteria Ratio (F:B) | 0.40 | 1.00 |
| Protozoa (count/g) | 10,000 | 50,000 |
| Nematodes (count/g) | 5 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

$$= (\text{target } C{:}N \text{ ratio for corn}) + (\text{adjustment due to soil analysis})$$
$$= (75.368 \cdot [\text{target } F{:}B \text{ ratio of corn}] + 10.864) + (35 \cdot [\text{deficiency in } F{:}B \text{ ratio}])$$
$$= (75.368 \cdot 1.00 + 10.864) + (35 \cdot [1.00 - 0.40])$$
$$= 107.2$$

As such, a feedstock with a C:N ratio of 107.2 is determined to be the optimal feedstock for corn growing in this particular soil. A feedstock (e.g., cow manure) or a blend of feedstocks is selected to most closely match the desired C:N ratio of 107.2.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 4, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.53 L of phosphorous mobilizer solution is added to increase the amount of phosphorous mobilizing bacteria because the actual soil value is lower than the target soil value.

TABLE 4

| | Actual Soil Value | Target Value | Full Dose (L) | % Dosage | Amount to Add |
|---|---|---|---|---|---|
| Biomass | | | | | |
| Active Bacteria (µg/g) | 22 | 30 | 1 | 27% | 0.27 L bacterial activator |
| Active Fungi (µg/g) | 4 | 30 | 1 | 87% | 0.87 L fungal activator |
| Diversity | | | | | |
| Nitrifying Bacteria (ppb) | 100 | 170 | 1 | 41% | 0.41 L nitrifying bacteria solution |
| Phosphorous Mobilizing Bacteria (ppb) | 755 | 1620 | 1 | 53% | 0.53 L phosphorous mobilizer solution |

TABLE 4-continued

| | Actual Soil Value | Target Value | Full Dose (L) | % Dosage | Amount to Add |
|---|---|---|---|---|---|
| Potassium Mobilizing Bacteria (ppb) | 1,400 | 2,615 | 1 | 46% | 0.46 L potassium mobilizer solution |
| Total Species of Microorganisms | 450,000 | 650,000 | 1 | 31% | 0.31 L diversity solution |
| Physical & Chemical | | | | | |
| pH | 6.0 | 6.3 | 1 | 50% | 0.50 L buffer solution |
| Electrical Conductivity (μS/cm) | 3,000 | 1,000 | 1 | 100% | 1.00 L salt tolerance solution |

Example 3

Corn is the crop intended to be grown at the soil location. To facilitate optimal plant growth, the soil is analyzed for the amounts of various life forms, such as bacteria, fungi, protozoa, and nematodes. As shown in Table 5 below, the experimentally determined soil values are compared with the target soil values for growing corn. The values shown below are recited relative to one gram of soil.

TABLE 5

| Biomass | Actual Soil Value | Target Value |
|---|---|---|
| Bacteria (μg/g) | 500 | 300 |
| Fungi (μg/g) | 600 | 300 |
| Fungi:Bacteria Ratio (F:B) | 1.20 | 1.00 |

TABLE 5-continued

| Biomass | Actual Soil Value | Target Value |
|---|---|---|
| Protozoa (count/g) | 7,000 | 50,000 |
| Nematodes (count/g) | 12 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

$$= (\text{target } C{:}N \text{ ratio for corn}) + (\text{adjustment due to soil analysis})$$
$$= (75.368 \cdot [\text{target } F{:}B \text{ ratio of corn}] + 10.864) + (35 \cdot [\text{deficiency in } F{:}B \text{ ratio}])$$
$$= (75.368 \cdot 1.00 + 10.864) + (35 \cdot [1.00 - 1.20])$$
$$= 79.2$$

As such, a feedstock with a C:N ratio of 79.2 is determined to be the optimal feedstock for corn growing in this particular soil. A feedstock (e.g., cow manure) or a blend of feedstocks is selected to most closely match the desired C:N ratio of 92.2.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 6, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.00 L of phosphorous mobilizer solution is added because the actual soil value is higher than the target soil value.

TABLE 6

|  | Actual Soil Value | Target Value | Full Dose (L) | % Dosage | Amount to Add |
|---|---|---|---|---|---|
| Biomass |  |  |  |  |  |
| Active Bacteria (μg/g) | 120 | 30 | 1 | 0% | 0.00 L bacterial activator |
| Active Fungi (μg/g) | 75 | 30 | 1 | 0% | 0.00 L fungal activator |
| Diversity |  |  |  |  |  |
| Nitrifying Bacteria (ppb) | 300 | 170 | 1 | 0% | 0.00 L nitrifying bacteria solution |
| Phosphorous Mobilizing Bacteria (ppb) | 2,000 | 1620 | 1 | 0% | 0.00 L phosphorous mobilizer solution |
| Potassium Mobilizing Bacteria (ppb) | 3,300 | 2,615 | 1 | 0% | 0.00 L potassium mobilizer solution |
| Total Species of Microorganisms | 800,000 | 650,000 | 1 | 0% | 0.00 L diversity solution |
| Physical & Chemical |  |  |  |  |  |
| pH | 7.3 | 6.3 | 1 | −100% | −1.00 L buffer solution |
| Electrical Conductivity (μS/cm) | 300 | 1,000 | 1 | 0% | 0.00 L salt tolerance solution |

Example 4

Corn is the crop intended to be grown at the soil location. To facilitate optimal plant growth, the soil is analyzed for the amounts of various life forms, such as bacteria, fungi, protozoa, and nematodes. As shown in Table 7 below, the experimentally determined soil values are compared with the target soil values for growing corn. The values shown below are recited relative to one gram of soil.

TABLE 7

| Biomass | Actual Soil Value | Target Value |
|---|---|---|
| Bacteria (μg/g) | 300 | 300 |
| Fungi (μg/g) | 300 | 300 |
| Fungi:Bacteria Ratio (F:B) | 1.00 | 1.00 |
| Protozoa (count/g) | 50,000 | 50,000 |
| Nematodes (count/g) | 10 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

As such, a feedstock with a C:N ratio of 86.2 is determined to be the optimal feedstock for corn growing in this particular soil. A feedstock (e.g., cow manure) or a blend of feedstocks is selected to most closely match the desired C:N ratio of 86.2.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 8, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.00 L of phosphorous mobilizer solution is added because the actual soil value is equal to the target soil value.

$$= (\text{target } C{:}N \text{ ratio for corn}) + (\text{adjustment due to soil analysis})$$

$$= (75.368 \cdot [\text{target } F{:}B \text{ ratio of corn}] + 10.864) + (35 \cdot [\text{deficiency in } F{:}B \text{ ratio}])$$

$$= (75.368 \cdot 1.00 + 10.864) + (35 \cdot [1.00 - 1.00])$$

$$= 86.2$$

TABLE 8

| | Actual Soil Value | Target Value | Full Dose (L) | % Dosage | Amount to Add |
|---|---|---|---|---|---|
| Biomass | | | | | |
| Active Bacteria (μg/g) | 30 | 30 | 1 | 0% | 0.00 L bacterial activator |
| Active Fungi (μg/g) | 30 | 30 | 1 | 0% | 0.00 L fungal activator |
| Diversity | | | | | |
| Nitrifying Bacteria (ppb) | 170 | 170 | 1 | 0% | 0.00 L nitrifying bacteria solution |
| Phosphorous Mobilizing Bacteria (ppb) | 1,620 | 1,620 | 1 | 0% | 0.00 L phosphorous mobilizer solution |
| Potassium Mobilizing Bacteria (ppb) | 2,615 | 2,615 | 1 | 0% | 0.00 L potassium mobilizer solution |
| Total Species of Microorganisms | 650,000 | 650,000 | 1 | 0% | 0.00 L diversity solution |
| Physical & Chemical | | | | | |
| pH | 6.3 | 6.3 | 1 | 0% | 0.00 L buffer solution |
| Electrical Conductivity (μS/cm) | 1,000 | 1,000 | 1 | 0% | 0.00 L salt tolerance solution |

Example 5

Cotton is the crop intended to be grown at the soil location. To facilitate optimal plant growth, the soil is analyzed for the amounts of various life forms, such as bacteria, fungi, protozoa, and nematodes. As shown in Table 9 below, the experimentally determined soil values are compared with the target soil values for growing cotton. The values shown below are recited relative to one gram of soil.

TABLE 9

| Biomass | Actual Soil Value | Target Value |
|---|---|---|
| Bacteria (μg/g) | 250 | 300 |
| Fungi (μg/g) | 100 | 300 |
| Fungi:Bacteria Ratio (F:B) | 0.40 | 1.00 |
| Protozoa (count/g) | 10,000 | 50,000 |
| Nematodes (count/g) | 5 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

As such, a feedstock with a C:N ratio of 107.2 is determined to be the optimal feedstock for cotton growing in this particular soil. A feedstock (e.g., cow manure) or a blend of feedstocks is selected to most closely match the desired C:N ratio of 107.2.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 10, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.00 L of phosphorous mobilizer solution is added because the actual soil value is higher than the target soil value.

$$= (\text{target } C{:}N \text{ ratio for cotton}) + (\text{adjustment due to soil analysis})$$

$$= (75.368 \cdot [\text{target } F{:}B \text{ ratio of cotton}] + 10.864) + (35 \cdot [\text{deficiency in } F{:}B \text{ ratio}])$$

$$= (75.368 \cdot 1.00 + 10.864) + (35 \cdot [1.00 - 0.40])$$

$$= 107.2$$

TABLE 10

| | Actual Soil Value | Target Value | Full Dose (L) | % Dosage | Amount to Add |
|---|---|---|---|---|---|
| Biomass | | | | | |
| Active Bacteria (μg/g) | 6 | 30 | 1 | 80% | 0.80 L bacterial activator |
| Active Fungi (μg/g) | 20 | 30 | 1 | 33% | 0.33 L fungal activator |
| Diversity | | | | | |
| Nitrifying Bacteria (ppb) | 100 | 170 | 1 | 41% | 0.41 L nitrifying bacteria solution |
| Phosphorous Mobilizing Bacteria (ppb) | 2,000 | 1,620 | 1 | 0% | 0.00 L phosphorous mobilizer solution |
| Potassium Mobilizing Bacteria (ppb) | 1,400 | 2,615 | 1 | 46% | 0.46 L potassium mobilizer solution |
| Total Species of Microorganisms | 700,000 | 650,000 | 1 | 0% | 0.00 L diversity solution |
| Physical & Chemical | | | | | |
| pH | 6.0 | 6.91 | | 90% | 0.90 L buffer solution |
| Electrical Conductivity (μS/cm) | 500 | 1,000 | 1 | 0% | 0.00 L salt tolerance solution |

Example 6

Cotton is the crop intended to be grown at the soil location. To facilitate optimal plant growth, the soil is analyzed for the amounts of various life forms, such as bacteria, fungi, protozoa, and nematodes. As shown in Table 11 below, the experimentally determined soil values are compared with the target soil values for growing cotton. The values shown below are recited relative to one gram of soil.

TABLE 11

| Biomass | Actual Soil Value | Target Value |
|---|---|---|
| Bacteria (μg/g) | 500 | 300 |
| Fungi (μg/g) | 300 | 300 |
| Fungi:Bacteria Ratio (F:B) | 0.60 | 1.00 |
| Protozoa (count/g) | 70,000 | 50,000 |
| Nematodes (count/g | 7 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

$$= (\text{target } C{:}N \text{ ratio for cotton}) + (\text{adjustment due to soil analysis})$$

$$= (75.368 \cdot [\text{target } F{:}B \text{ ratio of soybean}] + 10.864) + (35 \cdot [\text{deficiency in } F{:}B \text{ ratio}])$$

$$= (75.368 \cdot 1.00 + 10.864) + (35 \cdot [1.00 - 0.60])$$

$$= 100.2$$

As such, a feedstock with a C:N ratio of 100.2 is determined to be the optimal feedstock for cotton growing in this particular soil. A feedstock (e.g., cow manure) or a blend of feedstocks is selected to most closely match the desired C:N ratio of 100.2.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 12, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.10 L of phosphorous mobilizer solution is added to increase the amount of phosphorous mobilizing bacteria because the actual soil value is lower than the target soil value.

TABLE 12

|  | Actual Soil Value | Target Value | Full Dose (L) | % Dosage | Amount to Add |
|---|---|---|---|---|---|
| Biomass |  |  |  |  |  |
| Active Bacteria (μg/g) | 30 | 30 | 1 | 0% | 0.00 L bacterial activator |
| Active Fungi (μg/g) | 75 | 30 | 1 | 0% | 0.00 L fungal activator |
| Diversity |  |  |  |  |  |
| Nitrifying Bacteria (ppb) | 300 | 170 | 1 | 0% | 0.00 L nitrifying bacteria solution |
| Phosphorous Mobilizing Bacteria (ppb) | 1,457 | 1,620 | 1 | 10% | 0.10 L phosphorous mobilizer solution |
| Potassium Mobilizing Bacteria (ppb) | 3,300 | 2,615 | 1 | 0% | 0.00 L potassium mobilizer solution |
| Total Species of Microorganisms | 400,500 | 650,000 | 1 | 38% | 0.38 L diversity solution |
| Physical & Chemical |  |  |  |  |  |
| pH | 6.9 | 6.9 | 1 | 0% | 0.00 L buffer solution |
| Electrical Conductivity (μS/cm) | 900 | 1,000 | 1 | 0% | 0.00 L salt tolerance solution |

Example 7

Cotton is the crop intended to be grown at the soil location. To facilitate optimal plant growth, the soil is analyzed for the amounts of various life forms, such as bacteria, fungi, protozoa, and nematodes. As shown in Table 13 below, the experimentally determined soil values are compared with the target soil values for growing cotton. The values shown below are recited relative to one gram of soil.

TABLE 13

| Biomass | Actual Soil Value | Target Value |
|---|---|---|
| Bacteria (μg/g) | 300 | 300 |
| Fungi (μg/g) | 300 | 300 |
| Fungi:Bacteria Ratio (F:B) | 1.00 | 1.00 |
| Protozoa (count/g) | 9,000 | 50,000 |
| Nematodes (count/g) | 11 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

$$= (\text{target } C{:}N \text{ ratio for cotton}) + (\text{adjustment due to soil analysis})$$

$$= (75.368 \cdot [\text{target } F{:}B \text{ ratio of cotton}] + 10.864) + (35 \cdot [\text{deficiency in } F{:}B \text{ ratio}])$$

$$= (75.368 \cdot 1.00 + 10.864) + (35 \cdot [1.00 - 1.00])$$

$$= 86.2$$

As such, a feedstock with a C:N ratio of 86.2 is determined to be the optimal feedstock for cotton growing in this particular soil. A feedstock (e.g., cow manure) or a blend of feedstocks is selected to most closely match the desired C:N ratio of 86.2.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 14, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.00 L of phosphorous mobilizer solution is added because the actual soil value is equal to the target soil value.

TABLE 14

|  | Actual Soil Value | Target Value | Full Dose (L) | % Dosage | Amount to Add |
|---|---|---|---|---|---|
| Biomass | | | | | |
| Active Bacteria (μg/g) | 30 | 30 | 1 | 0% | 0.00 L bacterial activator |
| Active Fungi (μg/g) | 30 | 30 | 1 | 0% | 0.00 L fungal activator |
| Diversity | | | | | |
| Nitrifying Bacteria (ppb) | 170 | 170 | 1 | 0% | 0.00 L nitrifying bacteria solution |
| Phosphorous Mobilizing Bacteria (ppb) | 1,620 | 1,620 | 1 | 0% | 0.00 L phosphorous mobilizer solution |
| Potassium Mobilizing Bacteria (ppb) | 3,000 | 2,615 | 1 | 0% | 0.00 L potassium mobilizer solution |
| Total Species of Microorganisms | 650,000 | 650,000 | 1 | 0% | 0.00 L diversity solution |
| Physical & Chemical | | | | | |
| pH | 7.7 | 6.9 | 1 | −80% | −0.80 L buffer solution |
| Electrical Conductivity (μS/cm) | 100 | 1,000 | 1 | 0 | 0.00 L salt tolerance solution |

Example 8

Soybean is the crop intended to be grown at the soil location. To facilitate optimal plant growth, the soil is analyzed for the amounts of various life forms, such as bacteria, fungi, protozoa, and nematodes. As shown in Table 15 below, the experimentally determined soil values are compared with the target soil values for growing soybean. The values shown below are recited relative to one gram of soil.

TABLE 15

| Biomass | Actual Soil Value | Target Value |
|---|---|---|
| Bacteria (μg/g) | 150 | 300 |
| Fungi (μg/g) | 150 | 300 |
| Fungi:Bacteria Ratio (F:B) | 1.00 | 1.00 |
| Protozoa (count/g) | 10,000 | 50,000 |
| Nematodes (count/g) | 5 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

As such, a feedstock with a C:N ratio of 86.2 is determined to be the optimal feedstock for soybean growing in this particular soil. A feedstock (e.g., cow manure) or a blend of feedstocks is selected to most closely match the desired C:N ratio of 86.2.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 16, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.07 L of phosphorous mobilizer solution is added to increase the amount of phosphorous mobilizing bacteria because the actual soil value is lower than the target soil value.

$$= (\text{target } C{:}N \text{ ratio for soybean}) + (\text{adjustment due to soil analysis})$$

$$= (75.368 \cdot [\text{target } F{:}B \text{ ratio of soybean}] + 10.864) + (35 \cdot [\text{deficiency in } F{:}B \text{ ratio}])$$

$$= (75.368 \cdot 1.00 + 10.864) + (35 \cdot [1.00 - 1.00])$$

$$= 86.2$$

TABLE 16

|  | Actual Soil Value | Target Value | Full Dose (L) | % Dosage | Amount to Add |
|---|---|---|---|---|---|
| Biomass | | | | | |
| Active Bacteria (μg/g) | 22 | 30 | 1 | 27% | 0.27 L bacterial activator |
| Active Fungi (μg/g) | 25 | 30 | 1 | 17% | 0.17 L fungal activator |
| Diversity | | | | | |
| Nitrifying Bacteria (ppb) | 190 | 170 | 1 | 0% | 0.00 L nitrifying bacteria solution |
| Phosphorous Mobilizing Bacteria (ppb) | 1,500 | 1,620 | 1 | 7% | 0.07 L phosphorous mobilizer solution |
| Potassium Mobilizing Bacteria (ppb) | 1,400 | 2,615 | 1 | 46% | 0.46 L potassium mobilizer solution |
| Total Species of Microorganisms | 700,000 | 650,000 | 1 | 0% | 0.00 L diversity solution |
| Physical & Chemical | | | | | |
| pH | 6.0 | 6.4 | 1 | 40% | 0.40 L buffer solution |
| Electrical Conductivity (μS/cm) | 1500 | 1,000 | 1 | 50% | 0.50 L salt tolerance solution |

Example 9

Soybean is the crop intended to be grown at the soil location. To facilitate optimal plant growth, the soil is analyzed for the amounts of various life forms, such as bacteria, fungi, protozoa, and nematodes. As shown in Table 17 below, the experimentally determined soil values are compared with the target soil values for growing soybean. The values shown below are recited relative to one gram of soil.

TABLE 17

| Biomass | Actual Soil Value | Target Value |
|---|---|---|
| Bacteria (μg/g) | 500 | 300 |
| Fungi (μg/g) | 500 | 300 |
| Fungi:Bacteria Ratio (F:B) | 1.00 | 1.00 |
| Protozoa (count/g) | 70,000 | 50,000 |
| Nematodes (count/g) | 10 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

$$= (\text{target } C{:}N \text{ ratio for soybean}) + (\text{adjustment due to soil analysis})$$

$$= (75.368 \cdot [\text{target } F{:}B \text{ ratio of soybean}] + 10.864) + (35 \cdot [\text{deficiency in } F{:}B \text{ ratio}])$$

$$= (75.368 \cdot 1.00 + 10.864) + (35 \cdot [1.00 - 1.00])$$

$$= 86.2$$

As such, a feedstock with a C:N ratio of 86.2 is determined to be the optimal feedstock for soybean growing in this particular soil. A feedstock (e.g., cow manure) or a blend of feedstocks is selected to most closely match the desired C:N ratio of 86.2.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 18, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.00 L of phosphorous mobilizer solution is added because the actual soil value is higher than the target soil value.

TABLE 18

|  | Actual Soil Value | Target Value | Full Dose (L) | % Dosage | Amount to Add |
|---|---|---|---|---|---|
| Biomass | | | | | |
| Active Bacteria (µg/g) | 30 | 30 | 1 | 0% | 0.00 L bacterial activator |
| Active Fungi (µg/g) | 20 | 30 | 1 | 33% | 0.33 L fungal activator |
| Diversity | | | | | |
| Nitrifying Bacteria (ppb) | 300 | 170 | 1 | 0% | 0.00 L nitrifying bacteria solution |
| Phosphorous Mobilizing Bacteria (ppb) | 2,000 | 1,620 | 1 | 0% | 0.00 L phosphorous mobilizer solution |
| Potassium Mobilizing Bacteria (ppb) | 2,112 | 2,615 | 1 | 19% | 0.19 L potassium mobilizer solution |
| Total Species of Microorganisms | 650,000 | 650,000 | 1 | 0% | 0.00 L diversity solution |
| Physical & Chemical | | | | | |
| pH | 7.3 | 6.4 | 1 | −90% | −0.90 L buffer solution |
| Electrical Conductivity (µS/cm) | 300 | 1,000 | 1 | 0% | 0.00 L salt tolerance solution |

Example 10

Soybean is the crop intended to be grown at the soil location. To facilitate optimal plant growth, the soil is analyzed for the amounts of various life forms, such as bacteria, fungi, protozoa, and nematodes. As shown in Table 19 below, the experimentally determined soil values are compared with the target soil values for growing soybean. The values shown below are recited relative to one gram of soil.

TABLE 19

| Biomass | Actual Soil Value | Target Value |
|---|---|---|
| Bacteria (µg/g) | 300 | 300 |
| Fungi (µg/g) | 300 | 300 |
| Fungi:Bacteria Ratio (F:B) | 1.00 | 1.00 |
| Protozoa (count/g) | 50,000 | 50,000 |
| Nematodes (count/g) | 10 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

As such, a feedstock with a C:N ratio of 86.2 is determined to be the optimal feedstock for soybean growing in this particular soil. A feedstock (e.g., cow manure) or a blend of feedstocks is selected to most closely match the desired C:N ratio of 86.2.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 20, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.00 L of phosphorous mobilizer solution is added because the actual soil value is equal to the target soil value.

$$= (\text{target } C{:}N \text{ ratio for soybean}) + (\text{adjustment due to soil analysis})$$

$$= (75.368 \cdot [\text{target } F{:}B \text{ ratio of soybean}] + 10.864) + (35 \cdot [\text{deficiency in } F{:}B \text{ ratio}])$$

$$= (75.368 \cdot 1.00 + 10.864) + (35 \cdot [1.00 - 1.00])$$

$$= 86.2$$

TABLE 20

|  | Actual Soil Value | Target Value | Full Dose (L) | % Dosage | Amount to Add |
|---|---|---|---|---|---|
| Biomass | | | | | |
| Active Bacteria (µg/g) | 20 | 30 | 1 | 33% | 0.33 L bacterial activator |
| Active Fungi (µg/g) | 40 | 30 | 1 | 0% | 0.00 L fungal activator |
| Diversity | | | | | |
| Nitrifying Bacteria (ppb) | 170 | 170 | 1 | 0% | 0.00 L nitrifying bacteria solution |
| Phosphorous Mobilizing Bacteria (ppb) | 1,620 | 1,620 | 1 | 0% | 0.00 L phosphorous mobilizer solution |
| Potassium Mobilizing Bacteria (ppb) | 2,615 | 2,615 | 1 | 0% | 0.00 L potassium mobilizer solution |
| Total Species of Microorganisms | 650,000 | 650,000 | 1 | 0% | 0.00 L diversity solution |
| Physical & Chemical | | | | | |
| pH | 6.4 | 6.4 | 1 | 0% | 0.00 L buffer solution |
| Electrical Conductivity (µS/cm) | 900 | 1,000 | 1 | 0% | 0.00 L salt tolerance solution |

Example 11

Hemp is the crop intended to be grown at the soil location. To facilitate optimal plant growth, the soil is analyzed for the amounts of various life forms, such as bacteria, fungi, protozoa, and nematodes. As shown in Table 21 below, the experimentally determined soil values are compared with the target soil values for growing hemp. The values shown below are recited relative to one gram of soil.

TABLE 21

| Biomass | Actual Soil Value | Target Value |
|---|---|---|
| Bacteria (µg/g) | 250 | 300 |
| Fungi (µg/g) | 400 | 300 |
| Fungi:Bacteria Ratio (F:B) | 1.60 | 1.00 |
| Protozoa (count/g) | 10,000 | 50,000 |
| Nematodes (count/g) | 5 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

$$= (\text{target } C{:}N \text{ ratio for hemp}) + (\text{adjustment due to soil analysis})$$

$$= (75.368 \cdot [\text{target } F{:}B \text{ ratio of hemp}] + 10.864) + (35 \cdot [\text{deficiency in } F{:}B \text{ ratio}])$$

$$= (75.368 \cdot 1.00 + 10.864) + (35 \cdot [1.00 - 1.60])$$

$$= 65.2$$

As such, a feedstock with a C:N ratio of 65.2 is determined to be the optimal feedstock for hemp growing in this particular soil. A feedstock (e.g., cow manure) or a blend of feedstocks is selected to most closely match the desired C:N ratio of 65.2.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 22, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.55 L of phosphorous mobilizer solution is added to increase the amount of phosphorous mobilizing bacteria because the actual soil value is lower than the target soil value.

TABLE 22

| | Actual Soil Value | Target Value | Full Dose (L) | % Dosage | Amount to Add |
|---|---|---|---|---|---|
| Biomass | | | | | |
| Active Bacteria (µg/g) | 22 | 30 | 1 | 27% | 0.27 L bacterial activator |
| Active Fungi (µg/g) | 4 | 30 | 1 | 87% | 0.87 L fungal activator |
| Diversity | | | | | |
| Nitrifying Bacteria (ppb) | 100 | 195 | 1 | 49% | 0.49 L nitrifying bacteria solution |
| Phosphorous Mobilizing Bacteria (ppb) | 755 | 1,685 | 1 | 55% | 0.55 L phosphorous mobilizer solution |
| Potassium Mobilizing Bacteria (ppb) | 1,400 | 2,890 | 1 | 52% | 0.52 L potassium mobilizer solution |
| Total Species of Microorganisms | 450,000 | 700,000 | 1 | 36% | 0.36 L diversity solution |
| Physical & Chemical | | | | | |
| pH | 6.0 | 6.3 | 1 | 30% | 0.30 L buffer solution |
| Electrical Conductivity (µS/cm) | 3000 | 1,000 | 1 | 100% | 1.00 L salt tolerance solution |

Example 12

Hemp is the crop intended to be grown at the soil location. To facilitate optimal plant growth, the soil is analyzed for the amounts of various life forms, such as bacteria, fungi, protozoa, and nematodes. As shown in Table 23 below, the experimentally determined soil values are compared with the target soil values for growing hemp. The values shown below are recited relative to one gram of soil.

TABLE 23

| Biomass | Actual Soil Value | Target Value |
|---|---|---|
| Bacteria (µg/g) | 500 | 300 |
| Fungi (µg/g) | 600 | 300 |
| Fungi:Bacteria Ratio (F:B) | 1.20 | 1.00 |
| Protozoa (count/g) | 70,000 | 50,000 |
| Nematodes (count/g) | 12 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

$$= (\text{target } C\!:\!N \text{ ratio for hemp}) + (\text{adjustment due to soil analysis})$$

$$= (75.368 \cdot [\text{target } F\!:\!B \text{ ratio of hemp}] + 10.864) + (35 \cdot [\text{deficiency in } F\!:\!B \text{ ratio}])$$

$$= (75.368 \cdot 1.00 + 10.864) + (35 \cdot [1.00 - 1.20])$$

$$= 79.2$$

As such, a feedstock with a C:N ratio of 79.2 is determined to be the optimal feedstock for hemp growing in this particular soil. A feedstock (e.g., cow manure) or a blend of feedstocks is selected to most closely match the desired C:N ratio of 79.2.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 24, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.00 L of phosphorous mobilizer solution is added because the actual soil value is higher than the target soil value.

TABLE 24

|  | Actual Soil Value | Target Value | Full Dose (L) | % Dosage | Amount to Add |
|---|---|---|---|---|---|
| Biomass | | | | | |
| Active Bacteria (μg/g) | 120 | 30 | 1 | 0% | 0.00 L bacterial activator |
| Active Fungi (μg/g) | 75 | 30 | 1 | 0% | 0.00 L fungal activator |
| Diversity | | | | | |
| Nitrifying Bacteria (ppb) | 300 | 195 | 1 | 0% | 0.00 L nitrifying bacteria solution |
| Phosphorous Mobilizing Bacteria (ppb) | 2000 | 1,685 | 1 | 0% | 0.00 L phosphorous mobilizer solution |
| Potassium Mobilizing Bacteria (ppb) | 3,300 | 2,890 | 1 | 0% | 0.00 L potassium mobilizer solution |
| Total Species of Microorganisms | 800,000 | 700,000 | 1 | 0% | 0.00 L diversity solution |
| Physical & Chemical | | | | | |
| pH | 7.3 | 6.3 | 1 | −100% | −1.00 L buffer solution |
| Electrical Conductivity (μS/cm) | 300 | 1,000 | 1 | 0% | 0.00 L salt tolerance solution |

Example 13

Hemp is the crop intended to be grown at the soil location. To facilitate optimal plant growth, the soil is analyzed for the amounts of various life forms, such as bacteria, fungi, protozoa, and nematodes. As shown in Table 25 below, the experimentally determined soil values are compared with the target soil values for growing hemp. The values shown below are recited relative to one gram of soil.

TABLE 25

| Biomass | Actual Soil Value | Target Value |
|---|---|---|
| Bacteria (μg/g) | 300 | 300 |
| Fungi (μg/g) | 300 | 300 |
| Fungi:Bacteria Ratio (F:B) | 1.00 | 1.00 |
| Protozoa (count/g) | 50,000 | 50,000 |
| Nematodes (count/g) | 10 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

As such, a feedstock with a C:N ratio of 86.2 is determined to be the optimal feedstock for hemp growing in this particular soil. A feedstock (e.g., cow manure) or a blend of feedstocks is selected to most closely match the desired C:N ratio of 86.2.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 26, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.04 L of phosphorous mobilizer solution is added to increase the amount of phosphorous mobilizing bacteria because the actual soil value is lower than the target soil value.

$$= (\text{target } C{:}N \text{ ratio for hemp}) + (\text{adjustment due to soil analysis})$$

$$= (75.368 \cdot [\text{target } F{:}B \text{ ratio of hemp}] + 10.864) + (35 \cdot [\text{deficiency in } F{:}B \text{ ratio}])$$

$$= (75.368 \cdot 1.00 + 10.864) + (35 \cdot [1.00 - 1.00])$$

$$= 86.2$$

TABLE 26

|  | Actual Soil Value | Target Value | Full Dose (L) | % Dosage | Amount to Add |
|---|---|---|---|---|---|
| Biomass | | | | | |
| Active Bacteria (µg/g) | 30 | 30 | 1 | 0% | 0.00 L bacterial activator |
| Active Fungi (µg/g) | 30 | 30 | 1 | 0% | 0.00 L fungal activator |
| Diversity | | | | | |
| Nitrifying Bacteria (ppb) | 170 | 195 | 1 | 13% | 0.13 L nitrifying bacteria solution |
| Phosphorous Mobilizing Bacteria (ppb) | 1,620 | 1,685 | 1 | 4% | 0.04 L phosphorous mobilizer solution |
| Potassium Mobilizing Bacteria (ppb) | 2,615 | 2,890 | 1 | 10% | 0.10 L potassium mobilizer solution |
| Total Species of Microorganisms | 650,000 | 700,000 | 1 | 7% | 0.07 L diversity solution |
| Physical & Chemical | | | | | |
| pH | 6.3 | 6.3 | 1 | 0% | 0.00 L buffer solution |
| Electrical Conductivity (uS/cm) | 1,000 | 1,000 | 1 | 0% | 0.00 L salt tolerance solution |

Example 14

Banana is the crop intended to be grown at the soil location. To facilitate optimal plant growth, the soil is analyzed for the amounts of various life forms, such as bacteria, fungi, protozoa, and nematodes. As shown in Table 27 below, the experimentally determined soil values are compared with the target soil values for growing banana. The values shown below are recited relative to one gram of soil.

TABLE 27

| Biomass | Actual Soil Value | Target Value |
|---|---|---|
| Bacteria (µg/g) | 1000 | 300 |
| Fungi (µg/g) | 400 | 300 |
| Fungi:Bacteria Ratio (F:B) | 0.40 | 1.00 |
| Protozoa (count/g) | 10,000 | 50,000 |
| Nematodes (count/g) | 10 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

As such, a feedstock with a C:N ratio of 107.2 is determined to be the optimal feedstock for banana growing in this particular soil. A feedstock (e.g., cow manure) or a blend of feedstocks is selected to most closely match the desired C:N ratio of 107.2.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 28, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.57 L of phosphorous mobilizer solution is added to increase the amount of phosphorous mobilizing bacteria because the actual soil value is lower than the target soil value.

$$= (\text{target } C\text{:}N \text{ ratio for banana}) + (\text{adjustment due to soil analysis})$$

$$= (75.368 \cdot [\text{target } F\text{:}B \text{ ratio of banana}] + 10.864) + (35 \cdot [\text{deficiency in } F\text{:}B \text{ ratio}])$$

$$= (75.368 \cdot 1.00 + 10.864) + (35 \cdot [1.00 - 0.40])$$

$$= 107.2$$

TABLE 28

| | Actual Soil Value | Target Value | Full Dose (L) | Dosage | Amount to Add |
|---|---|---|---|---|---|
| Biomass | | | | | |
| Active Bacteria (μg/g) | 22 | 30 | 1 | 27% | 0.27 L bacterial activator |
| Active Fungi (μg/g) | 4 | 30 | 1 | 87% | 0.87 L fungal activator |
| Diversity | | | | | |
| Nitrifying Bacteria (ppb) | 100 | 195 | 1 | 49% | 0.49 L nitrifying bacteria solution |
| Phosphorous Mobilizing Bacteria (ppb) | 755 | 1,685 | 1 | 57% | 0.57 L phosphorous mobilizer solution |
| Potassium Mobilizing Bacteria (ppb) | 1,400 | 2,890 | 1 | 52% | 0.52 L potassium mobilizer solution |
| Total Species of Microorganisms | 450,000 | 700,000 | 1 | 36% | 0.36 L diversity solution |
| Physical & Chemical | | | | | |
| pH | 6.0 | 6.0 | 1 | 0% | 0.00 L buffer solution |
| Electrical Conductivity (μS/cm) | 2,000 | 1,000 | 1 | 100% | 1.00 L salt tolerance solution |

Example 15

Banana is the crop intended to be grown at the soil location. To facilitate optimal plant growth, the soil is analyzed for the amounts of various life forms, such as bacteria, fungi, protozoa, and nematodes. As shown in Table 29 below, the experimentally determined soil values are compared with the target soil values for growing banana. The values shown below are recited relative to one gram of soil.

TABLE 29

| Biomass | Actual Soil Value | Target Value |
|---|---|---|
| Bacteria (μg/g) | 100 | 300 |
| Fungi (μg/g) | 40 | 300 |
| Fungi:Bacteria Ratio (F:B) | 0.40 | 1.00 |
| Protozoa (count/g) | 70,000 | 50,000 |
| Nematodes (count/g) | 15 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

$$= (\text{target } C{:}N \text{ ratio for banana}) + (\text{adjustment due to soil analysis})$$

$$= (75.368 \cdot [\text{target } F{:}B \text{ ratio of banana}] + 10.864) + (35 \cdot [\text{deficiency in } F{:}B \text{ ratio}])$$

$$= (75.368 \cdot 1.00 + 10.864) + (35 \cdot [1.00 - 0.40])$$

$$= 107.2$$

As such, a feedstock with a C:N ratio of 107.2 is determined to be the optimal feedstock for banana growing in this particular soil. A feedstock (e.g., cow manure) or a blend of feedstocks is selected to most closely match the desired C:N ratio of 107.2.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 30, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.00 L of phosphorous mobilizer solution is added because the actual soil value is higher than the target soil value.

TABLE 30

| | Actual Soil Value | Target Value | Full Dose (L) | % Dosage | Amount to Add |
|---|---|---|---|---|---|
| Biomass | | | | | |
| Active Bacteria (µg/g) | 5 | 30 | 1 | 83% | 0.83 L bacterial activator |
| Active Fungi (µg/g) | 15 | 30 | 1 | 50% | 0.50 L fungal activator |
| Diversity | | | | | |
| Nitrifying Bacteria (ppb) | 300 | 195 | 1 | 0% | 0.00 L nitrifying bacteria solution |
| Phosphorous Mobilizing Bacteria (ppb) | 2,000 | 1,685 | 1 | 0% | 0.00 L phosphorous mobilizer solution |
| Potassium Mobilizing Bacteria (ppb) | 3,300 | 2,890 | 1 | 0% | 0.00 L potassium mobilizer solution |
| Total Species of Microorganisms | 800,000 | 700,000 | 1 | 0% | 0.00 L diversity solution |
| Physical & Chemical | | | | | |
| pH | 7.3 | 6.0 | 1 | −130% | −1.30 L buffer solution |
| Electrical Conductivity (µS/cm) | 300 | 1,000 | 1 | 0% | 0.00 L salt tolerance solution |

Example 16

Banana is the crop intended to be grown at the soil location. To facilitate optimal plant growth, the soil is analyzed for the amounts of various life forms, such as bacteria, fungi, protozoa, and nematodes. As shown in Table 31 below, the experimentally determined soil values are compared with the target soil values for growing banana. The values shown below are recited relative to one gram of soil.

TABLE 31

| Biomass | Actual Soil Value | Target Value |
|---|---|---|
| Bacteria (µg/g) | 600 | 300 |
| Fungi (µg/g) | 300 | 300 |
| Fungi:Bacteria Ratio (F:B) | 0.50 | 1.00 |
| Protozoa (count/g) | 50,000 | 50,000 |
| Nematodes (count/g) | 10 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

As such, a feedstock with a C:N ratio of 103.7 is determined to be the optimal feedstock for banana growing in this particular soil. A feedstock (e.g., cow manure) or a blend of feedstocks is selected to most closely match the desired C:N ratio of 103.7.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 32, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.00 L of phosphorous mobilizer solution is added because the actual soil value is equal to the target soil value.

$$= (\text{target } C{:}N \text{ ratio for banana}) + (\text{adjustment due to soil analysis})$$

$$= \left(75.368 \cdot [\text{target } F{:}B \text{ ratio of banana}] + 10.864\right) + \left(35 \cdot [\text{deficiency in } F{:}B \text{ ratio}]\right)$$

$$= (75.368 \cdot 1.00 + 10.864) + (35 \cdot [1.00 - 0.50])$$

$$= 103.7$$

TABLE 32

|  | Actual Soil Value | Target Value | Full Dose (L) | % Dosage | Amount to Add |
|---|---|---|---|---|---|
| Biomass | | | | | |
| Active Bacteria (μg/g) | 30 | 30 | 1 | 0% | 0.00 L bacterial activator |
| Active Fungi (μg/g) | 30 | 30 | 1 | 0% | 0.00 L fungal activator |
| Diversity | | | | | |
| Nitrifying Bacteria (ppb) | 195 | 195 | 1 | 0% | 0.00 L nitrifying bacteria solution |
| Phosphorous Mobilizing Bacteria (ppb) | 1,685 | 1,685 | 1 | 0% | 0.00 L phosphorous mobilizer solution |
| Potassium Mobilizing Bacteria (ppb) | 2,890 | 2,890 | 1 | 0% | 0.00 L potassium mobilizer solution |
| Total Species of Microorganisms | 700,000 | 700,000 | 1 | 0% | 0.00 L diversity solution |
| Physical & Chemical | | | | | |
| pH | 6.0 | 6.0 | 1 | 0% | 0.00 L buffer solution |
| Electrical Conductivity (μS/cm) | 1000 | 1,000 | 1 | 0% | 0.00 L salt tolerance solution |

Example 17

Grape is the crop intended to be grown at the soil location. To facilitate optimal plant growth, the soil is analyzed for the amounts of various life forms, such as bacteria, fungi, protozoa, and nematodes. As shown in Table 33 below, the experimentally determined soil values are compared with the target soil values for growing grape. The values shown below are recited relative to one gram of soil.

TABLE 33

| Biomass | Actual Soil Value | Target Value |
|---|---|---|
| Bacteria (μg/g) | 150 | 300 |
| Fungi (μg/g) | 500 | 600 |
| Fungi:Bacteria Ratio (F:B) | 3.33 | 2.00 |
| Protozoa (count/g) | 10,000 | 50,000 |
| Nematodes (count/g) | 5 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

As such, a feedstock with a C:N ratio of 114.9 is determined to be the optimal feedstock for grape growing in this particular soil. A feedstock (e.g., cow manure) or a blend of feedstocks is selected to most closely match the desired C:N ratio of 114.9.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 34, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.14 L of phosphorous mobilizer solution is added to increase the amount of phosphorous mobilizing bacteria because the actual soil value is lower than the target soil value.

$$= (\text{target } C{:}N \text{ ratio for grape}) + (\text{adjustment due to soil analysis})$$

$$= (75.368 \cdot [\text{target } F{:}B \text{ ratio of grape}] + 10.864) + (35 \cdot [\text{deficiency in } F{:}B \text{ ratio}])$$

$$= (75.368 \cdot 2.00 + 10.864) + (35 \cdot [2.00 - 3.33])$$

$$= 114.9$$

TABLE 34

|  | Actual Soil Value | Target Value | Full Dose (L) | % Dosage | Amount to Add |
|---|---|---|---|---|---|
| Biomass | | | | | |
| Active Bacteria (µg/g) | 22 | 30 | 1 | 27% | 0.27 L bacterial activator |
| Active Fungi (µg/g) | 4 | 60 | 1 | 93% | 0.93 L fungal activator |
| Diversity | | | | | |
| Nitrifying Bacteria (ppb) | 50 | 85 | 1 | 41% | 0.41 L nitrifying bacteria solution |
| Phosphorous Mobilizing Bacteria (ppb) | 755 | 880 | 1 | 14% | 0.14 L phosphorous mobilizer solution |
| Potassium Mobilizing Bacteria (ppb) | 1,000 | 1,230 | 1 | 19% | 0.19 L potassium mobilizer solution |
| Total Species of Microorganisms | 450,000 | 720,000 | 1 | 38% | 0.38 L diversity solution |
| Physical & Chemical | | | | | |
| pH | 5.5 | 5.7 | 1 | 20% | 0.20 L buffer solution |
| Electrical Conductivity (µS/cm) | 2,500 | 1,000 | 1 | 100% | 1.00 L salt tolerance solution |

Example 18

Grape is the crop intended to be grown at the soil location. To facilitate optimal plant growth, the soil is analyzed for the amounts of various life forms, such as bacteria, fungi, protozoa, and nematodes. As shown in Table 35 below, the experimentally determined soil values are compared with the target soil values for growing grape. The values shown below are recited relative to one gram of soil.

TABLE 35

| Biomass | Actual Soil Value | Target Value |
|---|---|---|
| Bacteria (µg/g) | 2,000 | 300 |
| Fungi (µg/g) | 1,000 | 600 |
| Fungi:Bacteria Ratio (F:B) | 0.50 | 2.00 |
| Protozoa (count/g) | 70,000 | 50,000 |
| Nematodes (count/g) | 11 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

As such, a feedstock with a C:N ratio of 150.0 is determined to be the optimal feedstock for grape growing in this particular soil. A feedstock (e.g., cow manure) or a blend of feedstocks is selected to most closely match the desired C:N ratio of 150.0.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 36, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.00 L of phosphorous mobilizer solution is added because the actual soil value is higher than the target soil value.

$= (\text{target } C{:}N \text{ ratio for grape}) + (\text{adjustment due to soil analysis})$ $= (75.368 \cdot [\text{target } F{:}B \text{ ratio of grape}] + 10.864) + (35 \cdot [\text{deficiency in } F{:}B \text{ ratio}])$ $= (75.368 \cdot 2.00 + 10.864) + (35 \cdot [2.00 - 0.50])$ $= 214.1$ $= 214.1 > 150$, therefore the target $C{:}N$ ratio used is 150.

TABLE 36

| | Actual Soil Value | Target Value | Full Dose (L) | % Dosage | Amount to Add |
|---|---|---|---|---|---|
| Biomass | | | | | |
| Active Bacteria (μg/g) | 120 | 30 | 1 | 0% | 0.00 L bacterial activator |
| Active Fungi (μg/g) | 450 | 60 | 1 | 0% | 0.00 L fungal activator |
| Diversity | | | | | |
| Nitrifying Bacteria (ppb) | 300 | 85 | 1 | 0% | 0.00 L nitrifying bacteria solution |
| Phosphorous Mobilizing Bacteria (ppb) | 2,000 | 880 | 1 | 0% | 0.00 L phosphorous mobilizer solution |
| Potassium Mobilizing Bacteria (ppb) | 3,300 | 1,230 | 1 | 0% | 0.00 L potassium mobilizer solution |
| Total Species of Microorganisms | 800,000 | 720,000 | 1 | 0% | 0.00 L diversity solution |
| Physical & Chemical | | | | | |
| pH | 7.3 | 5.7 | 1 | −160% | −1.60 L buffer solution |
| Electrical Conductivity (μS/cm) | 300 | 1,000 | 1 | 0% | 0.00 L salt tolerance solution |

Example 19

Grape is the crop intended to be grown at the soil location. To facilitate optimal plant growth, the soil is analyzed for the amounts of various life forms, such as bacteria, fungi, protozoa, and nematodes. As shown in Table 37 below, the experimentally determined soil values are compared with the target soil values for growing grape. The values shown below are recited relative to one gram of soil.

TABLE 37

| Biomass | Actual Soil Value | Target Value |
|---|---|---|
| Bacteria (μg/g) | 300 | 300 |
| Fungi (μg/g) | 600 | 600 |
| Fungi:Bacteria Ratio (F:B) | 2.00 | 2.00 |
| Protozoa (count/g) | 50,000 | 50,000 |
| Nematodes (count/g) | 10 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

As such, a feedstock with a C:N ratio of 150.0 is determined to be the optimal feedstock for grape growing in this particular soil. A feedstock (e.g., cow manure) or a blend of feedstocks is selected to most closely match the desired C:N ratio of 150.0.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 38, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.00 L of phosphorous mobilizer solution is added because the actual soil value is equal to the target soil value.

$= (\text{target } C{:}N \text{ ratio for grape}) + (\text{adjustment due to soil analysis})$ $= (75.368 \cdot [\text{target } F{:}B \text{ ratio of grape}] + 10.864) + 35 \cdot [\text{deficiency in } F{:}B \text{ ratio}])$ $= (75.368 \cdot 2.00 + 10.864) + (35 \cdot [2.00 - 2.00])$ $= 161.6$ $= 161.6 > 150.0$, therefore the target $C{:}N$ ratio is 150.

TABLE 38

| | Actual Soil Value | Target Value | Full Dose (L) | % Dosage | Amount to Add |
|---|---|---|---|---|---|
| Biomass | | | | | |
| Active Bacteria (μg/g) | 30 | 30 | 1 | 0% | 0.00 L bacterial activator |
| Active Fungi (μg/g) | 60 | 60 | 1 | 0% | 0.00 L fungal activator |
| Diversity | | | | | |
| Nitrifying Bacteria (ppb) | 85 | 85 | 1 | 0% | 0.00 L nitrifying bacteria solution |
| Phosphorous Mobilizing Bacteria (ppb) | 880 | 880 | 1 | 0% | 0.00 L phosphorous mobilizer solution |
| Potassium Mobilizing Bacteria (ppb) | 1,200 | 1,230 | 1 | 0% | 0.00 L potassium mobilizer solution |
| Total Species of Microorganisms | 720,000 | 720,000 | 1 | 0% | 0.00 L diversity solution |
| Physical & Chemical | | | | | |
| pH | 4.0 | 5.7 | 1 | 170% | 1.70 L buffer solution |
| Electrical Conductivity (μS/cm) | 1000 | 1,000 | 1 | 0% | 0.00 L salt tolerance solution |

Example 20

Tea tree is the crop intended to be grown at the soil location. To facilitate optimal plant growth, the soil is analyzed for the amounts of various life forms, such as bacteria, fungi, protozoa, and nematodes. As shown in Table 39 below, the experimentally determined soil values are compared with the target soil values for growing tea trees. The values shown below are recited relative to one gram of soil.

TABLE 39

| Biomass | Actual Soil Value | Target Value |
|---|---|---|
| Bacteria (μg/g) | 100 | 300 |
| Fungi (μg/g) | 3,000 | 1,500 |
| Fungi:Bacteria Ratio (F:B) | 30.00 | 5.00 |
| Protozoa (count/g) | 5,000 | 10,000 |
| Nematodes (count/g) | 5 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

As such, a feedstock with a C:N ratio of 40.0 is determined to be the optimal feedstock for tea trees growing in this particular soil. A feedstock (e.g., cow manure) or a blend of feedstocks is selected to most closely match the desired C:N ratio of 40.0.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 40, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.31 L of phosphorous mobilizer solution is added to increase the amount of phosphorous mobilizing bacteria because the actual soil value is lower than the target soil value.

$$= (\text{target } C{:}N \text{ ratio for tea tree}) + (\text{adjustment due to soil analysis})$$

$$= (75.368 \cdot [\text{target } F{:}B \text{ ratio of tea tree}] + 10.864) + (35 \cdot [\text{deficiency in } F{:}B \text{ ratio}])$$

$$= (75.368 \cdot 5.00 + 10.864) + (35 \cdot [5.00 - 30.00])$$

$$= -487.3$$

$$= -487.3 < 40.0, \text{ therefore the target } C{:}N \text{ ratio is } 40.$$

TABLE 40

|  | Actual Soil Value | Target Value | Full Dose (L) | % Dosage | Amount to Add |
|---|---|---|---|---|---|
| Biomass | | | | | |
| Active Bacteria (µg/g) | 22 | 30 | 1 | 27% | 0.27 L bacterial activator |
| Active Fungi (µg/g) | 180 | 150 | 1 | 0% | 0.00 L fungal activator |
| Diversity | | | | | |
| Nitrifying Bacteria (ppb) | 80 | 100 | 1 | 20% | 0.20 L nitrifying bacteria solution |
| Phosphorous Mobilizing Bacteria (ppb) | 555 | 800 | 1 | 31% | 0.31 L phosphorous mobilizer solution |
| Potassium Mobilizing Bacteria (ppb) | 800 | 1,100 | 1 | 27% | 0.27 L potassium mobilizer solution |
| Total Species of Microorganisms | 450,000 | 720,000 | 1 | 38% | 0.38 L diversity solution |
| Physical & Chemical | | | | | |
| pH | 5.0 | 5.5 | 1 | 50% | 0.50 L buffer solution |
| Electrical Conductivity (µS/cm) | 3000 | 1,000 | 1 | 100% | 1.00 L salt tolerance solution |

Example 21

Tea tree is the crop intended to be grown at the soil location. To facilitate optimal plant growth, the soil is analyzed for the amounts of various life forms, such as bacteria, fungi, protozoa, and nematodes. As shown in Table 41 below, the experimentally determined soil values are compared with the target soil values for growing tea trees. The values shown below are recited relative to one gram of soil.

TABLE 41

| Biomass | Actual Soil Value | Target Value |
|---|---|---|
| Bacteria (µg/g) | 2,500 | 300 |
| Fungi (µg/g) | 3,000 | 1,500 |
| Fungi:Bacteria Ratio (F:B) | 12.00 | 5.00 |
| Protozoa (count/g) | 70,000 | 10,000 |
| Nematodes (count/g) | 12 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

As such, a feedstock with a C:N ratio of 142.7 is determined to be the optimal feedstock for tea trees growing in this particular soil. A feedstock (e.g., cow manure) or a blend of feedstocks is selected to most closely match the desired C:N ratio of 142.7.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 42, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.00 L of phosphorous mobilizer solution is added because the actual soil value is higher than the target soil value.

$$= (\text{target } C{:}N \text{ ratio for tea tree}) + (\text{adjustment due to soil analysis})$$

$$= (75.368 \cdot [\text{target } F{:}B \text{ ratio of tea tree}] + 10.864) + (35 \cdot [\text{deficiency in } F{:}B \text{ ratio}])$$

$$= (75.368 \cdot 5.00 + 10.864) + (35 \cdot [5.00 - 12.00])$$

$$= 142.7$$

TABLE 42

|  | Actual Soil Value | Target Value | Full Dose (L) | % Dosage | Amount to Add |
|---|---|---|---|---|---|
| Biomass | | | | | |
| Active Bacteria (μg/g) | 120 | 30 | 1 | 0% | 0.00 L bacterial activator |
| Active Fungi (μg/g) | 500 | 150 | 1 | 0% | 0.00 L fungal activator |
| Diversity | | | | | |
| Nitrifying Bacteria (ppb) | 300 | 100 | 1 | 0% | 0.00 L nitrifying bacteria solution |
| Phosphorous Mobilizing Bacteria (ppb) | 2,000 | 880 | 1 | 0% | 0.00 L phosphorous mobilizer solution |
| Potassium Mobilizing Bacteria (ppb) | 3,300 | 1,100 | 1 | 0% | 0.00 L potassium mobilizer solution |
| Total Species of Microorganisms | 800,000 | 720,000 | 1 | 0% | 0.00 L diversity solution |
| Physical & Chemical | | | | | |
| pH | 7.3 | 5.5 | 1 | −180% | −1.80 L buffer solution |
| Electrical Conductivity (μS/cm) | 3000 | 1,000 | 1 | 0% | 0.00 L salt tolerance solution |

Example 22

Tea tree is the crop intended to be grown at the soil location. To facilitate optimal plant growth, the soil is analyzed for the amounts of various life forms, such as bacteria, fungi, protozoa, and nematodes. As shown in Table 43 below, the experimentally determined soil values are compared with the target soil values for growing tea trees. The values shown below are recited relative to one gram of soil.

TABLE 43

| Biomass | Actual Soil Value | Target Value |
|---|---|---|
| Bacteria (μg/g) | 300 | 300 |
| Fungi (μg/g) | 1,500 | 1,500 |
| Fungi:Bacteria Ratio (F:B) | 5.00 | 5.00 |
| Protozoa (count/g) | 10,000 | 10,000 |
| Nematodes (count/g) | 10 | 10 |

These analyses of soil life forms are used to determined what type of feedstock will be cultured. For instance, possible feedstocks of animal manure, tree bark, and leaves each have different properties that can make them more or less suitable, depending on the properties of the soil and depending on which crop is planned to be grown.

For example, a feedstock can be selected based on the optimal carbon to nitrogen ration (C:N ratio). In this embodiment, the optimal C:N ratio is calculated according to the equation below, wherein the ratio of fungi to bacteria (F:B ratio) is the life form parameter of interest. The optimal C:N ratio cannot be lower than 40 or greater than 150.

As such, a feedstock with a C:N ratio of 150.0 is determined to be the optimal feedstock for tea trees growing in this particular soil. A feedstock (e.g., cow manure) or a blend of feedstocks is selected to most closely match the desired C:N ratio of 150.0.

In addition to selecting the identity of the feedstock, certain additives can be added during culturing of the feedstock to further improve the soil. For example, if the amount of active fungi is determined to be lower than optimal, a liquid fungal activator can be added to the feedstock during culturing.

For this embodiment, as shown in Table 44, the soil is analyzed for biomass properties, diversity properties, and physio-chemical properties. Based on comparisons between the experimentally determined values and the target values for each property, different volumes (in liters) of each additives are calculated and added to the feedstock during culturing to provide for optimal growing conditions for corn according to the present invention. For example, 0.00 L of phosphorous mobilizer solution is added because the actual soil value is equal to the target soil value.

$= \bigl(\text{target } C{:}N \text{ ratio for tea tree}\bigr) + \bigl(\text{adjustment due to soil analysis}\bigr)$ $= \bigl(75.368 \cdot [\text{target } F{:}B \text{ ratio of tea tree}] + 10.864\bigr) + \bigl(35 \cdot [\text{deficiency in } F{:}B \text{ ratio}]\bigr)$ $= (75.368 \cdot 5.00 + 10.864) + (35 \cdot [5.00 - 5.00])$ $= 387.7$ $= 387.7 > 150.0$, therefore the target $C{:}N$ ratio is 150.0

TABLE 44

| | Actual Soil Value | Target Value | Full Dose (L) | % Dosage | Amount to Add |
|---|---|---|---|---|---|
| Biomass | | | | | |
| Active Bacteria (µg/g) | 30 | 30 | 1 | 0% | 0.00 L bacterial activator |
| Active Fungi (µg/g) | 150 | 150 | 1 | 0% | 0.00 L fungal activator |
| Diversity | | | | | |
| Nitrifying Bacteria (ppb) | 100 | 100 | 1 | 0% | 0.00 L nitrifying bacteria solution |
| Phosphorous Mobilizing Bacteria (ppb) | 800 | 800 | 1 | 0% | 0.00 L phosphorous mobilizer solution |
| Potassium Mobilizing Bacteria (ppb) | 1,100 | 1,100 | 1 | 0% | 0.00 L potassium mobilizer solution |
| Total Species of Microorganisms | 720,000 | 720,000 | 1 | 0% | 0.00 L diversity solution |
| Physical & Chemical | | | | | |
| pH | 5.5 | 5.5 | 1 | 170% | 1.70 L buffer solution |
| Electrical Conductivity (µS/cm) | 1,000 | 1,000 | 1 | 0% | 0.00 L salt tolerance solution |

What is claimed is:

1. A method for increasing the fertility of a soil at a soil location, comprising:
   a) assessing a parameter of the soil;
   b) aerobically culturing a feedstock based on the assessed parameter to produce a culturing product, wherein the culturing comprises:
      (i) thermally composting the feedstock;
      (ii) actively or passively cooling the feedstock; and
      (iii) continuing to culture the feedstock,
   wherein at least part of the aerobic culturing is performed at a culturing location within 200 km of the soil location;
   wherein the culturing further comprises adding a biological inoculant to the feedstock, wherein the biological inoculant is selected from the group consisting of:
      plant material obtained from within 200 km of the soil location;
      rhizosphere soil obtained from the rhizosphere surrounding a plant located within 200 km of the soil location; and
      one or more microbes isolated from rhizosphere soil obtained from the rhizosphere surrounding a plant located within 200 km of the soil location;
   c) generating a soil fertility composition from the culturing product; and
   d) applying the soil fertility composition to the soil at the soil location.

2. The method of claim 1, wherein the soil parameter is a biological parameter of the soil selected from the group consisting of: which species of microbes are present in the soil; the relative amounts of two or more species of microbes present in the soil; the mass of fungi, bacteria, protozoa, nematodes, or a combination thereof in the soil.

3. The method of claim 2, wherein the microbes are fungi, bacteria, or a combination thereof.

4. The method of claim 2, wherein the soil parameter is a biological parameter of the soil selected from the group consisting of: protozoa, nematodes, or a combination thereof in the soil.

5. The method of claim 1, wherein the soil parameter is a physical or chemical parameter of the soil selected from the group consisting of: concentration of nitrogen, phosphorous, or potassium; soil pH; ratio of organic matter to inorganic matter by mass; ratio of calcium to magnesium by mass; mass percentage of the soil that is sand, silt, and clay.

6. The method of claim 1, wherein the feedstock comprises plant material from a plant species that is planned to be grown at the soil location.

7. The method of claim 1, wherein aerobically culturing the feedstock comprises adding a material to the feedstock selected from the group consisting of: water, a microbe food, a microbe growth accelerator, worms, a pH adjusting agent, and a mineral.

8. The method of claim 1, wherein aerobically culturing the feedstock comprises monitoring a culturing parameter of the feedstock and adding the biological inoculant to the feedstock is based on the monitoring.

9. The method of claim 8, wherein the culturing parameter is a physical or chemical parameter of the feedstock selected from the group consisting of: concentration of nitrogen, phosphorous, or potassium; feedstock pH; ratio of organic matter to inorganic matter by mass; and ratio of calcium to magnesium by mass.

10. The method of claim 8, wherein the material added to the feedstock is worms of the species Eisenia fetida (red wiggler worm), Eisenia andrei, Eisenia hortensis, Dendrobaena veneta, or a combination thereof.

11. The method of claim 1, wherein the biological inoculant is plant material from a first species, wherein a plant of the first species is planned to be grown at the soil location.

12. The method of claim 1, wherein the biological inoculant is a laboratory microbe, wherein the culturing results in the laboratory microbe adapting to the culturing environment, wherein the soil fertility composition comprises the laboratory microbe.

13. The method of claim 1, wherein the biological inoculant comprises a microbe that was not detected in the soil during the assessing step, or that was detected in the soil during the assessing step in an amount determined to be less than a desirable mount of the microbe.

14. The method of claim 13, wherein the desirable amount of the microbe was determined based on one or more of:
   a) a soil parameter other than the amount of the microbe;
   b) the identity of a plant planned to be grown in the soil;
   c) the average rainfall pattern, temperature pattern, sunlight pattern, humidity pattern, wind pattern, or a combination thereof at the soil location; and d) the time of year that the soil fertility composition is planned to be applied to the soil.

15. The method of claim 1, wherein the culturing comprises contacting the feedstock with ultrasound.

16. The method of claim 1, wherein the culturing further comprises growing a plant in the feedstock, wherein the plant is from a species that is planned to be grown at the soil location.

17. The method of claim 1, wherein continuing to culture the feedstock comprises continuously directing air through the feedstock for 5 minutes or more.

18. The method of claim 17, wherein directing the air through the feedstock involves a fan positioned above the feedstock that draws air upwards and through the feedstock.

19. The method of claim 1, wherein the culturing further comprises placing the feedstock in one or more subunits of a system, wherein the placing is performed after the cooling and before adding worms, wherein the system comprises:
   a) two or more subunits that each comprise:
      (i) two or more side panels comprising one or more internal panels and one or more external panels, wherein each internal panel is permeable to microbes and is in contacts an internal panel of another subunit, wherein each external panel is impermeable to air and water;
      (ii) an open top;
      (iii) a bottom comprising a bottom door;
      (iv) a first attachment member for lifting the subunit;
      (v) a second attachment member for connecting the subunit to another subunit;
   b) a base configured such that the two or more subunits can sit on top of the base; and
   c) a top configured to sit on top of and cover the two or more subunits;
   wherein each subunit can be removed from the system independently such that a unit not removed from the system can continue to produce a culturing product.

20. The method of claim 1, wherein generating the soil fertility composition comprises mixing the culturing product with a volume of water.

21. The method of claim 20, wherein the generating comprises filtering the culturing product through a filtration membrane to obtain a liquid filtrate and a solid residue, wherein the soil fertility composition comprises the liquid filtrate.

22. The method of claim 21, wherein the filtration membrane is vibrated during the filtration step.

23. The method of claim 1, wherein the generating comprises making a foliar spray from the culturing product, wherein the soil fertility composition comprises the foliar spray.

24. The method of claim 1, wherein the soil fertility composition is a liquid suspension and the applying comprises spraying the soil fertility composition.

25. The method of claim 1, further comprising assessing the parameter of the soil at a second time after the applying step.

26. The method of claim 1, wherein generating a soil fertility composition comprises removing feedstock from a subunit of the system through the bottom door of the subunit,
   wherein the method further comprises:
      thermally composting a second feedstock;
      cooling the second feedstock; and
      placing the second feedstock in the subunit,
   thereby allowing inoculation of the second feedstock in the subunit with worms and other microbes from a feedstock in an adjacent subunit by permeation of the worms and other microbes through an internal panel of the adjacent subunit and through an internal panel of the subunit.

27. The method of claim 26, further comprising performing a second culturing step to create a second culturing product based on the determining of the effect of the application of the liquid fertility composition on the growth of a plant in the soil.

28. The method of claim 1, wherein the biological inoculant is plant material obtained from within 200 km of the soil location.

29. The method of claim 1, wherein the biological inoculant is rhizosphere soil obtained from the rhizosphere surrounding a plant located within 200 km of the soil location.

30. The method of claim 1, wherein the biological inoculant is one or more microbes isolated from rhizosphere soil obtained from the rhizosphere surrounding a plant located within 200 km of the soil location.

\* \* \* \* \*